United States Patent [19]
Konno et al.

[11] Patent Number: 5,767,955
[45] Date of Patent: Jun. 16, 1998

[54] SHORT-WIDTH PULSE GENERATING APPARATUS FOR MEASUREMENT OF REFLECTION POINT, SAMPLING APPARATUS FOR MEASUREMENT OF REFLECTION POINT AND REFLECTION POINT MEASURING APPARATUS

[75] Inventors: Takeshi Konno, Sendai; Takao Sakurai, Utsunomiya; Kouji Sasaki, Sendai, all of Japan

[73] Assignee: Advantest Corporation, Tokyo, Japan

[21] Appl. No.: 604,525

[22] Filed: Feb. 21, 1996

[30] Foreign Application Priority Data

Feb. 23, 1995 [JP] Japan ................................ 7-035172
Jun. 30, 1995 [JP] Japan ................................ 7-165956

[51] Int. Cl.$^6$ .................... G01N 21/88; G03K 17/968
[52] U.S. Cl. .................. 356/73.1; 324/534; 327/369
[58] Field of Search .................. 356/73.1; 324/534; 327/369

[56] References Cited

U.S. PATENT DOCUMENTS 3,558,920   1/1971   Giaever ........................... 327/369

OTHER PUBLICATIONS

Danielson et al "Guided –Wave Reflectometry, With Micrometer Resolution" Applied Optics vol. 26 No. 14, 15 Jul. 1987, pp. 2836–2842 copy 356173.1.

*Primary Examiner*—Vincent P. McGraw
*Attorney, Agent, or Firm*—Staas & Halsey

[57] ABSTRACT

A short-width pulse generating apparatus for use in measurement of a reflection point, a sampling apparatus for use in measurement of a a reflection point, and a reflection point measuring apparatus each being able to specify a reflection position produced in an integrated high-frequency circuit or a reflection point produced in the inside of an optical element with high accuracy are provided. A short-width pulse generation apparatus comprises short-width optical pulse generating means for generating an optical probe pulse having a narrow pulse width and photoelectric conversion means for producing a short-width electric pulse on a signal transmission line when irradiated with an optical probe pulse, and a sampling apparatus comprises variable delay means for sequentially delaying an optical probe pulse and second photoelectric conversion means for sampling an electric potential on the signal transmission line by being irradiated with an optical probe pulse delayed by the variable delay means. A reflection point measuring apparatus comprises a combination of the short-width pulse generating apparatus and the sampling apparatus.

16 Claims, 15 Drawing Sheets

5,767,955

SHORT-WIDTH PULSE GENERATING APPARATUS FOR MEASUREMENT OF REFLECTION POINT, SAMPLING APPARATUS FOR MEASUREMENT OF REFLECTION POINT AND REFLECTION POINT MEASURING APPARATUS

BACKGROUND OF THE INVENTION

1. Field of the Invention

The present invention relates to a short-width pulse generating apparatus for use in measurement of a reflection point, a sampling apparatus for use in measurement of a reflection point, and a reflection point measuring apparatus each adapted to be utilized in specifying or identifying a reflection point where a portion of an incident wave is reflected, that is, a reflection point of a reflected wave, for example, produced in a high-frequency circuit element or component through which a microwave or the like transmits.

Also, the present invention relates to a reflection point measuring apparatus adapted to be utilized in specifying or identifying a reflection point of a reflected light, for example, produced in an optical element or component.

Herein the term "short-width" means that the pulse width or duration of a pulse is narrow or short. In particular, it means that the full width or half width at half maximum of a pulse is narrow or short.

2. Description of Related Art

Generally, in an apparatus for measuring a reflection point of an electric wave or pulse produced, for example, in an electric transmission line or path and measuring a distance to that reflection point, which is generally referred to as TDR (Time Domain Reflectometer), it is well known that the more a pulse width of an electric pulse given to an object to be measured or device under test is narrow, the more the accuracy of the measurement is improved so that a higher resolution or resolving power can be obtained. In order to distinguish one pulse from the immediately following pulse in successive pulses arriving in close vicinity to one another, it is conditioned that there exists a mesial point between two adjacent pulses, that is, a point on the trailing edge of pulse waveform corresponding to a half of the pulse amplitude. Accordingly, the full width at half maximum (FWHM) of a pulse which is given to an object to be measured is called the resolution or resolving power of a distance measuring apparatus.

Also, in a prior OTDR (Optical Time Domain Reflectometer), an optical pulse generated by a laser diode (LD) or the like is entered into DUT (device under test or device to be measured) and a reflected optical pulse is detected by a photodiode and then the reflection point from which the optical pulse is reflected is measured based on a waveform of time base obtained. However, in this method, the resolution regarding the reflection point is at most of the order of several ten centimeters due to a broad pulse width of the optical pulse and a receivable band of the light receiving system. Moreover, even the resolution of an interference type OTDR using an incoherent light source is at most several millimeters.

In a circuit element or component, for example, through which a microwave transmits, if there is an impedance mismatching point in the circuit, a reflected wave is produced at that impedance mismatching point. The generation of the reflected wave is generally a factor of bringing on a degradation of the characteristic or performance of the circuit element. To this end, if it is possible to specify or identify which point or position in the circuit the reflected wave has been produced, it is very advantageous in developing a circuit element, and there is obtained an effect that a time duration of developing a circuit component can be reduced and the like.

However, in case that an object to be measured is a circuit element, a distance measuring range for the circuit element is of the order of at most 10 mm. A pulse having a very short pulse duration or width must be generated in order to measure a reflection point produced within such short distance range with a high resolution.

A TDR using a sampling oscilloscope is given as one of means for measuring a reflection distance in a circuit element. In a sampling oscilloscope the full width at half maximum (FWHM) of a pulse which is given into a circuit to be measured is of the order of 35 ps (picoseconds) even the narrowest in pulse width. Assuming that the FWHM of a pulse is 35 ps, the distance resolution L is found by the following equation:

$$L = \text{velocity of light} \times FWHM \text{ (in vacuum)}$$

Accordingly, the distance resolution in this case in vacuum is expressed by the following equation:

$$L = 3.0 \times 10^{8} (m/s) \times 35 \times 10^{-2}(s) = 10.5 \text{ mm}$$

In practice, this distance resolution L is affected by the permittivity (dielectric constant) $\epsilon$ of an insulation substrate on which a circuit is formed and has a value of L multiplied by $(1/\sqrt{\epsilon})$. For example, if $Al_2O_3$ of $\epsilon=10$ is used, then L is equal to 3.323 mm (L=3.323 mm).

In case of the distance resolution L=3.323 mm, if the full length to be measured of a DUT is 3 mm, it is impossible to specify any reflection point in the DUT within the range of 3 mm. According to the recent tendency, circuit elements are formed into an integrated circuit, and so the range of distance to be measured is of the order of several millimeters. Therefore, the prior art brings on a disadvantage that it is impossible to specify a reflection point in a high-frequency circuit element formed in an integrated circuit.

On the other hand, in optical components such as a laser diode module or the like, reflection of light in an optical circuit bring on degradation in the characteristic of the module. In order to improve the characteristic of the module, it is necessary to reduce reflection of light. However, the prior art OTDR has a low resolution and it cannot be possible to specify a reflection point. Optical components such as lens, optical fiber, semiconductor elements and the like are arranged side by side at intervals of several millimeters in a module, and therefore an OTDR having its resolution of submillimeter is required to specify a reflection point in a module.

SUMMARY OF THE INVENTION

An object of the present invention is to provide a short-width pulse generating apparatus for use in measurement of a reflection point, a sampling apparatus for use in measurement of a reflection point, and a reflection point measuring apparatus constructed by a combination of the short-width pulse generating apparatus and the sampling apparatus each of which is capable of improving the distance resolution and of specifying a reflection point in a circuit element formed in an integrated circuit with high resolution.

Another object of the present invention is to provide an OTDR having a high resolution.

In accordance with one aspect of the present invention, there is provided a short-width pulse generating apparatus for detecting a reflection point which comprises a short-width optical pulse generating means for generating an optical probe pulse having a narrow pulse width and a photoelectric conversion means for producing a short-width electric pulse in a signal transmission line or path each time the photoelectric conversion means is irradiated with an optical probe pulse generated by the short-width optical pulse generating means.

The short-width pulse generating apparatus for detecting a reflection point as constructed above can generate a short-width electric pulse the pulse width or duration of which is extremely narrow or short, for example a short-width electric pulse having the full width at half maximum of about 0.1 to 1 ps (picosecond). Therefore, the distant resolution L thereof is:

$$L=(0.03 \text{ to } 0.3)\times 1/\sqrt{\varepsilon} \text{ mm}=(30 \text{ to } 300)\times 1/\sqrt{\varepsilon} \text{ }\mu\text{m}$$

and so the very high resolution can be obtained.

In accordance with second aspect of the present invention, a sampling apparatus for use in measurement of a reflection point is provided which comprises a short-width optical pulse generating means for generating an optical probe pulse having a narrow pulse width, variable delay means for sequentially delaying an optical probe pulse generated by the short-width optical pulse generating means, and a photoelectric conversion means for sampling an electric potential on a signal transmission line or path by that the photoelectric conversion means is irradiated with a delayed optical probe pulse supplied from the delay means.

Since the sampling apparatus as constructed above utilizes the fast response characteristic of the photoelectric conversion means to sample an electric potential on the signal transmission line, it is possible to sample waveform data of a reflected wave with a high resolution.

In accordance with third aspect of the present invention, there is provided a sampling apparatus for use in measurement of a reflection point which comprises an electro-optical element coupled to a signal transmission line or path and a polarization intensity detecting element for detecting an intensity or strength of polarized light. The electro-optical element is provided with a reflection surface for reflecting an incident optical probe pulse and gives to a reflected optical probe pulse a polarization having an intensity or strength depending upon an electric field produced on the periphery of the signal transmission line. The intensity of the polarized light is detected by the polarization intensity detecting element thereby obtaining an electric signal corresponding to the electric field produced on the signal transmission line.

The sampling apparatus according to the third aspect of the present invention brings an advantage that a reflected wave can be sampled with high resolution.

In accordance with fourth aspect of the present invention, there is provided a reflection point measuring apparatus which is constructed by a combination of the short-width pulse generating apparatus for detecting a reflection point according to the first aspect of the present invention and the sampling apparatus for measuring a reflection point according to the second aspect of the present invention.

The reflection point measuring apparatus according to the fourth aspect of the present invention can specify the location or position of a reflected point with a high resolution because the pulse width of a short-width pulse signal generated by the short-width pulse generating apparatus is extremely narrow and the electric potential of a reflected wave is sampled by an optical probe pulse having narrow pulse width.

In accordance with fifth aspect of the present invention, there is provided a reflection point measuring apparatus which is constructed by a combination of the short-width pulse generating apparatus for detecting a reflection point according to the first aspect of the present invention and the sampling apparatus for measuring a reflection point according to the third aspect of the present invention.

Since the reflection point measuring apparatus according to the fifth aspect of the present invention uses the electro-optical element as a sampling apparatus, the resolution of the sampling apparatus can be improved.

In accordance with sixth aspect of the present invention, there is provided a reflection point measuring apparatus in which a short-width optical pulse generator for generating an optical pulse having an extremely narrow pulse width is utilized as a light source, and the optical probe pulse is entered into an object to be measured through an optical transmission line or path, and a reflected light wave reflected back from the object to be measured is separated from the optical transmission line and acquired by a reflected light acquisition means, and the reflected light wave acquired by the reflected light acquisition means is incident on a first photoelectric conversion means whereby a short-width electric pulse having a narrow pulse width is obtained on a signal transmission line or path, and a portion of the optical probe pulse is given to a variable delay means, and a second photoelectric conversion means formed between the signal transmission line and a signal pick-up electrode placed near the signal transmission line is irradiated with the optical probe pulse delayed by the variable delay means whereby a short-width electric pulse produced on the signal transmission line is sampled and taken out.

In the reflection point measuring apparatus according to the sixth aspect of the present invention the distance measuring performance can be obtained with high resolution because the pulse width of an optical pulse generated by the light source is extremely narrow and the pulse width of an electric pulse converted by the first photoelectric conversion means is narrow.

In accordance with seventh aspect of the present invention, there is provided a reflection point measuring apparatus in which a pair of short-width optical pulse generating means for generating two optical probe pulses having a narrow pulse width and slightly differing in frequency from each other are provided, and a short-width optical probe pulse generated from one of the two optical pulse generating means is given to an object to be measured, and a reflected light reflected back from the object to be measured is acquired by a reflected light acquisition means, and the reflected light acquired by the reflected light acquisition means is incident on a first photoelectric conversion means whereby a short-width electric pulse having a narrow pulse width is produced on a signal transmission line or path, and a second photoelectric conversion means formed between the signal transmission line and a signal pick-up electrode placed near the signal transmission line is irradiated with a short-width optical probe pulse generated from the other of the two optical pulse generating means whereby a short-width electric pulse produced on the signal transmission line is sampled and taken out. In this case, since the frequencies of the two optical probe pulses generated by the pair of short-width optical pulse generating means are slightly different from each other, the sampling position or point is shifted bit by bit.

The reflection point measuring apparatus according to the seventh aspect of the present invention can sequentially sample an electric pulse generated on the signal transmission line in the direction of time base without using any variable delay means.

In accordance with eighth aspect of the present invention, a reflection point measuring apparatus is provided in which an electrically operating circuit element is rendered an object to be measured by utilizing the reflection point measuring apparatus according to the seventh aspect of the present invention.

In the reflecting point measuring apparatus according to the eighth aspect of the present invention it is possible to construct a reflection point measuring apparatus in which an electrically operating circuit element is rendered an object to be measured, without using any variable delay means. As a result, the construction of the reflection point measuring apparatus is simplified.

In accordance with ninth aspect of the present invention, there is provided a reflection point measuring apparatus using an electro-optical element coupled to a signal transmission line or path as a sampling means. The electro-optical element is provided with a reflection surface which is the bottom surface contacting with the signal transmission line, and an electric field produced on the signal transmission line is applied to the electro-optical element. When an optical probe pulse delayed by a variable delay means or an optical probe pulse slightly differing in frequency from the delayed optical probe pulse is reflected at the reflection surface of the electro-optical element, the electro-optical element gives to the reflected optical probe pulse a polarization having an intensity or strength depending on the electric potential of an electric pulse produced on the signal transmission line. The intensity of the polarized light is detected whereby an electric pulse produced on the signal transmission line is sampled.

BRIEF DESCRIPTION OF THE DRAWINGS

The invention itself, together with further objects and attendant advantages, will best be understood by reference to the following description, taken in conjunction with the accompanying drawings, in which.

DETAILED DESCRIPTION OF THE PREFERRED EMBODIMENTS

Figure 1:
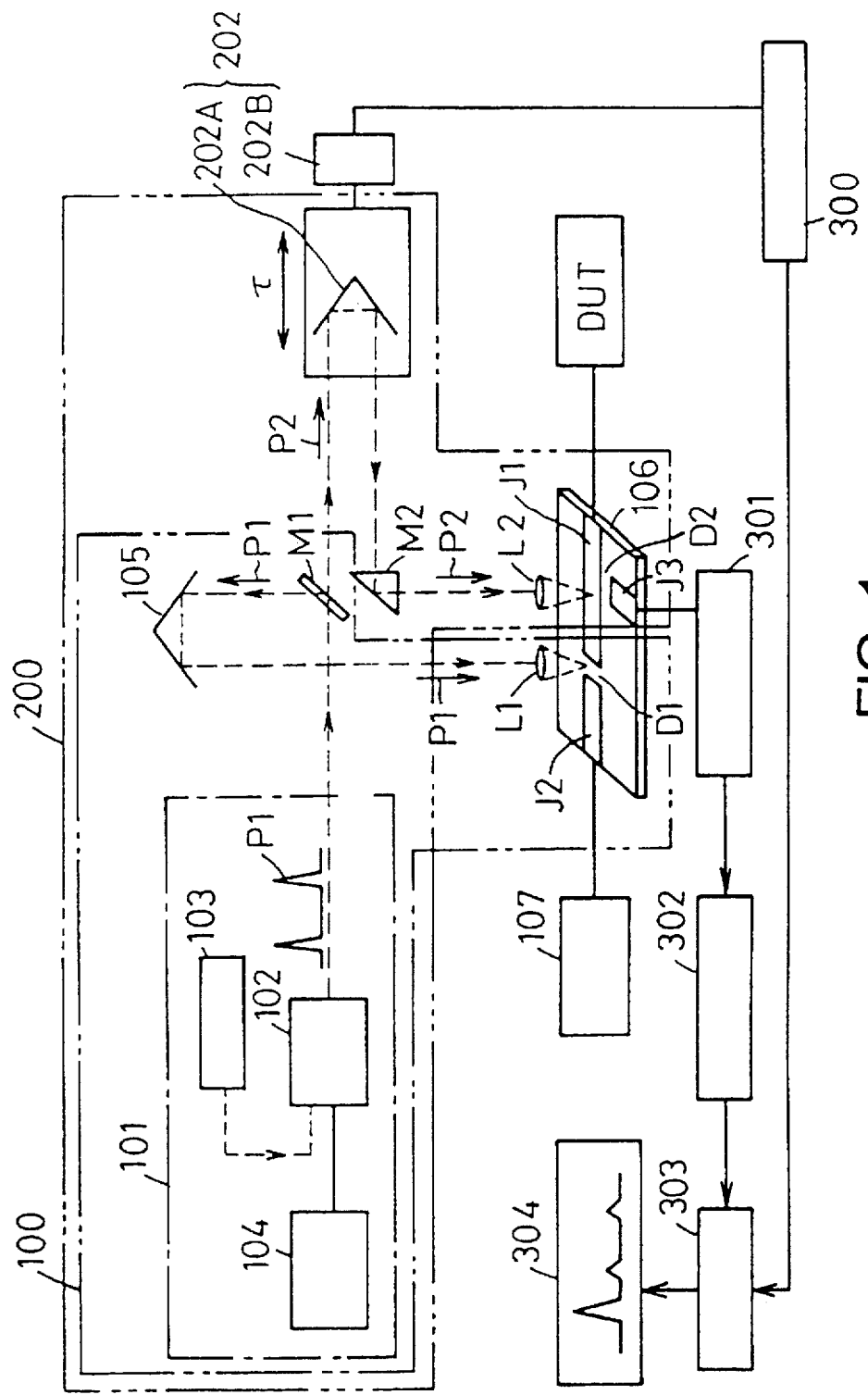
FIG. 1 is a block diagram showing first embodiment of the reflection point measuring apparatus according to the present invention.

FIG. 1 shows first embodiment of the reflection point measuring apparatus according to the present invention. This first embodiment is constructed by a combination of a short-width pulse generating apparatus 100 for use in measurement of a reflection point according to the first aspect of the present invention and a sampling apparatus 200 for use in measurement of a reflection point according to the second aspect of the present invention.

As shown in FIG. 1, the illustrated short-width pulse generating apparatus 100 according to the present invention comprises a short-width optical pulse generating means 101 for generating an optical probe pulse P1 and a first photoelectric conversion means D1 for producing a short-width electric pulse on a signal transmission line or path J1 each time the photoelectric conversion means is irradiated with the optical probe pulse P1 emitted from the short-width optical pulse generating means 101.

Figure 3:
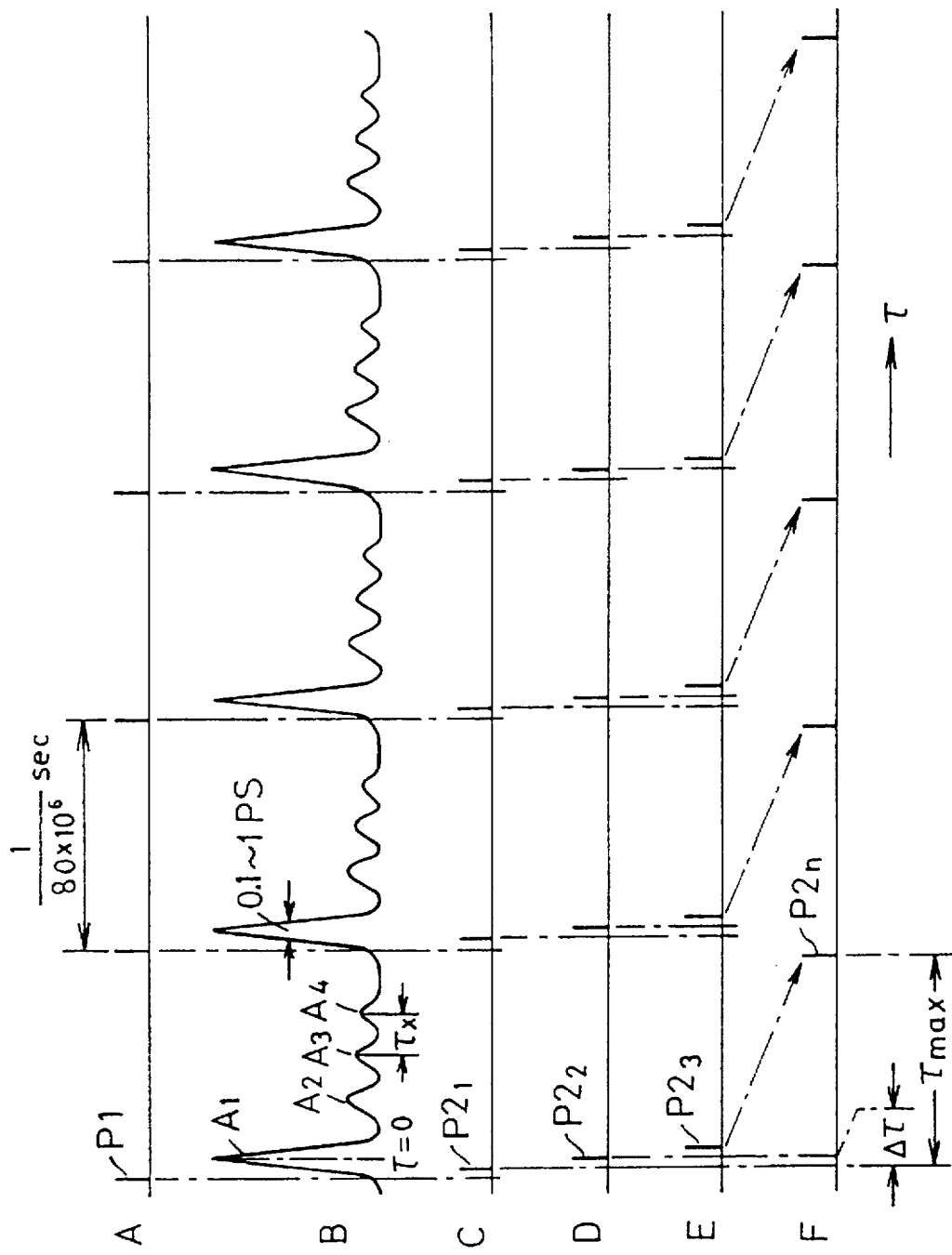
FIG. 3 is waveforms for explaining the operation of the reflection point measuring apparatus shown in FIG. 1.

The short-width optical pulse generating means 101 comprises, in this embodiment, a main laser oscillator 102, an exciting or pumping laser oscillator 103, and a mode locking laser oscillator having a synchronizing circuit 104. A titanium-sapphire laser oscillator may be used as the main laser oscillator 102, and an argon laser oscillator may be used as the exciting laser oscillator 103. One example of such mode locking laser oscillator thus constructed contains the mode locking titanium-sapphire laser oscillator made by Spectra-Physics Laser Inc. in U.S.A. which can be used in this embodiment. From this mode locking titanium-sapphire laser oscillator can be obtained an optical probe pulse P1 having pulse repetition frequency (PRF) of 80 MHz and pulse duration of 80 fs ($10^{-15}$ seconds). FIG. 3A shows a waveform of this optical probe pulse P1.

The optical probe pulse P1 generated by the short-width optical pulse generating means 101 is split into two optical pulses, that is, a reflected optical pulse and a transmitted optical pulse by a semitransparent mirror (beam splitter) M1, and one of the two optical pulses, namely, the reflected optical pulse P1 is incident on a fixed reflecting mirror 105. The fixed mirror 105 comprises two reflecting mirrors coupled to each other at a suitable angle, and is adapted to reflect an incident light in the opposite direction along a reflection light path which is different from the incident light path and parallel to the incident path. Accordingly, the reflected optical pulse P1 is turned in its propagating direction by the fixed mirror 105, and is converged by a condenser lens L1 to illuminate the photoelectric conversion means D1.

Figure 2:
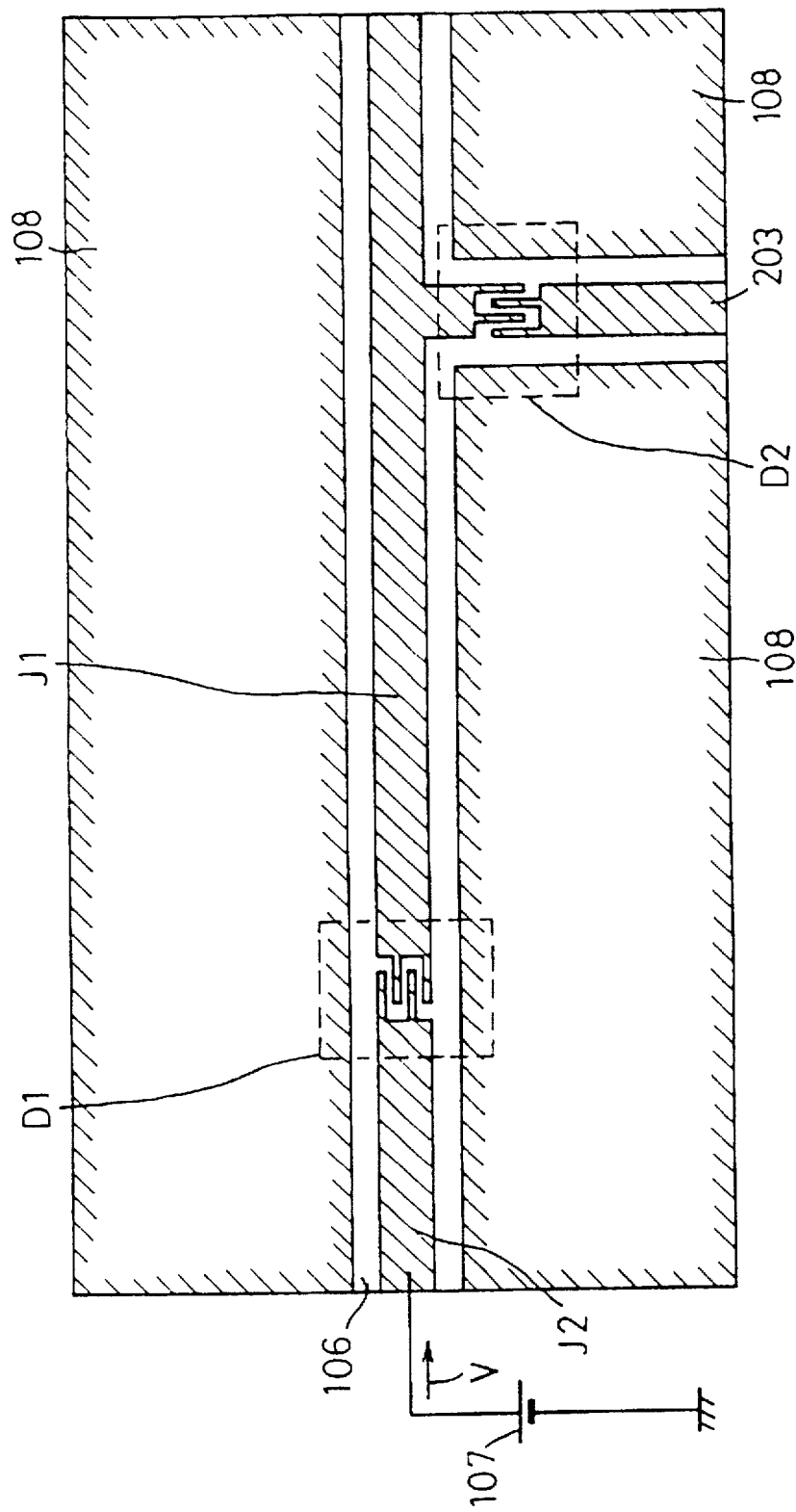
FIG. 2 is an enlarged plan view showing one example of the photoelectric conversion means used in the reflection point measuring apparatus shown in FIG. 1.

The first photoelectric conversion means D1 may be composed of, for example, a semi-insulating substrate 106 which comprises an insulating substrate made of, for example, indium-phosphorus (InP) or the like into which a small quantity of iron (Fe) is doped. The semi-insulating substrate 106 has strip-like electrically conductive patterns J1 and J2 on the one surface at the central portion thereof. These strip-like conductive patterns J1 and J2 are disposed in the lengthwise direction of the semi-insulating substrate 106 with a predetermined gap therebetween and in alignment with each other. As shown in FIG. 2 in enlarged size, these conductive patterns J1 and J2 have comb-like (pectinated) shapes on their opposing portions, respectively, so that each pattern can have an increased area to be irradiated with light by interlocking the teeth of both the comb-like shapes.

The gap between the conductive patterns J1 and J2 becomes electrically conductive when light is irradiated on the gap. Therefore, by applying a DC voltage V to the conductive pattern J2 from a DC power supply 107 and irradiating the opposing portions of the conductive patterns having the comb-like shapes with the optical probe pulse P1, an electric pulse signal $A_1$ (FIG. 3B) having its peak value corresponding to the DC voltage V can be produced on the conductive pattern J1. In addition to the electric pulse signal $A_1$, reflected waves $A_2$, $A_3$, $A_4$ are added and shown in FIG. 3B. The pulse duration or width of the electric pulse signal $A_1$ has an extremely short duration and the full width at half maximum thereof is of the order of 0.1 to 1 ps since the pulse duration or width of the optical probe pulse P1 is extremely short or narrow. Accordingly, an electric pulse signal the pulse duration of which is extremely short can be obtained.

The electric pulse signal $A_1$ having an extremely short pulse duration propagates through the conductive pattern J1 in the right direction in FIG. 2, and is inputted into an object to be measured (a circuit to be measured) DUT connected to the right-hand end portion of the conductive pattern J1 (see FIG. 1). Since the conductive pattern J1 is utilized as a propagation line of a signal, hereinafter the conductive pattern J1 is referred to as a signal transmission line (path) or signal conductor. Further, it is necessary that the signal transmission line J1 transmits an electric pulse having an extremely short pulse duration without deteriorating the its waveform, and accordingly, in this embodiment, grounded conductors 108 are disposed on both sides of the signal transmission line J1, as shown in FIG. 2, thereby to set the characteristic impedance of the signal transmission line to a desired value of, for example, 50 Ω. The signal transmission line thus structurized is generally called a coplanar line. In addition, a signal transmission line having a microstrip line structure may be used. The grounded conductors 108 are omitted in FIG. 1.

The other optical probe pulse P1 split by the semitransparent mirror M1, namely, the transmitted optical probe pulse P1 is entered into the sampling apparatus 200 for use in measurement of a reflection point according to the present invention. The sampling apparatus 200 comprises, in this embodiment, the short-width optical pulse generating means 101 mentioned above, variable delay means 202 for giving a variable delay time τ to an optical probe pulse P1 generated from the short-width optical pulse generating means 101, and a second photoelectric conversion means D2 for sampling an electric potential on the signal transmission line J1 by that the second photoelectric conversion means D2 is irradiated with a delayed optical probe pulse P2 supplied from the variable delay means 202.

The variable delay means 202 comprises, in this example, a movable mirror 202A and a stage driver 202B for driving the movable mirror 202A. The stage driver 202B, in response to a timing signal supplied from a controller 300, reciprocatingly moves the movable mirror 202A step by step or continuously in the direction parallel to the direction that the optical probe pulse P1 propagates thereby varying the delay time τ given to the optical probe pulse P1 step by step or continuously. In other words, the timing of sampling is gradually shifted in the direction of the time base. The movable mirror 202A has a similar structure to that of the fixed mirror 105, and is adapted to give a predetermined delay time to an incident optical probe pulse P1 and to reflect the delayed optical probe pulse P2 along a reflection light path which is different from the incident light path and parallel thereto. Further, for the purpose of easy understanding of explanation, hereinafter the case the movable mirror 202A is moved step by step will be described.

The optical probe pulse P2 delayed by the variable delay means 202 is reflected by a reflecting mirror M2 in the downward direction substantially perpendicular to the incident light path and is converged by a condenser lens L2 to irradiate a second photoelectric conversion means D2. This second photoelectric conversion means D2 comprises, in this embodiment, a short branch line or path branched perpendicularly from the signal transmission line J1, and a strip-like signal pick-up electrode 203 disposed in alignment with the short branch line with a predetermined gap therebetween as shown in FIG. 2 in enlarged size. Similar to the first photoelectric conversion means D1, these short branch line and signal pick-up electrode 203 have comb-like (pectinated) shapes on their opposing portions, respectively, so that each of them can have an increased area to be irradiated with light by interlocking the teeth of both the comb-like shapes.

The gap between the short branch line and the signal pick-up electrode 203 becomes electrically conductive when light is irradiated on the gap. Therefore, by the second photoelectric conversion means D2 being irradiated with the optical probe pulse P2, the electric potential on the signal transmission line J1 at the time that the second photoelectric conversion means D2 has been irradiated with the optical probe pulse P2 (at the delayed timing) is taken out on the signal pick-up electrode 203 whereby the electric potential is sampled.

The sampled voltage signal taken out on the signal pick-up electrode 203 is detected by a detector 301 which may be, for example, a lock-in amplifier or the like, and the detected voltage signal is converted into a digital signal by an analog-digital (A/D) converter 302, which is supplied to an arithmetic unit 303 where the digital signal undergoes a de-convolution process, and is displayed on a display 304.

FIGS. 3C to 3F show a manner of sampling. FIG. 3C shows a state in which a delay time Δτ is given to the transmitted optical probe pulse P1 at the position where the movable mirror 202A has moved by one step from the starting position. The optical probe pulse to which the delay time Δτ is given is indicated by a character $P2_1$. This optical probe pulse $P2_1$ continues to irradiate the second photoelectric conversion means D2 so that the electric potential on the signal transmission line J1 at the time delayed by Δτ is continuously sampled and the sampled electric potential is continuously inputted into the detector 301. The detector 301 may be a lock-in amplifier or the like as mentioned above, and the detected output (analog signal) is supplied to the A/D converter 302 where it is converted into a digital signal thereby deciding the value of waveform data at the delay time Δτ.

When the A/D converter 302 has completed the operation of A/D conversion, the controller 300 outputs a command for altering the delay time to the variable delay means 202. The variable delay means 202 moves the movable mirror 202A by further one step to the next time delay position. The pulse P2$_2$ in FIG. 3D shows an optical probe pulse to which the delay time 2Δτ is given at the next stop position of the movable mirror (the next time delay position). When this optical probe pulse P2$_2$ is given to the second photoelectric conversion means D2, the output of the detector 301 is supplied to the A/D converter 302 where the value of waveform data at the delay time 2Δτ is converted into a digital signal and is put in the arithmetic unit 303.

Thereafter, the above-mentioned operation is repeated by sequentially moving the movable mirror 202A step by step until the maximum time delay position thereof, and the maximum delay time τ$_{max}$ at the maximum time delay position is given to the transmitted optical probe pulse P1 whereby the optical probe pulse P2$_n$ to which the maximum delay time τ$_{max}$ is given is emitted from the variable delay means 202. The optical probe pulse P2$_n$ irradiates the second photoelectric conversion means D2, and the value of waveform data at that time is converted into a digital signal by the A/D converter 302 which is entered into the arithmetic unit 303.

The arithmetic unit 303 joins together the waveform data at respective delayed timings, which are converted into digital signals by the A/D converter 302, and performs de-convolution process of them to restore to the waveform data on the original time base, and displays them on the display 304 as the waveform on the time base.

Here, the signal detected by the detector 301 is an integrated value of voltage signals obtained by a plurality of sampling operations due to the response characteristic of the detector 301. Let this detected output signal be R(τ), a short-width electric pulse generated by the short-width pulse generating apparatus 100 be X(t), and the time waveform to which the delay time τ is given be X(t+τ), then the detected output signal R(τ) is found by the following equation:

$$R(\tau) = \int_0^\infty X(t) \cdot X(t+\tau) dt$$

As shown in FIG. 3B, R(τ) takes the maximum value at the peak point of the short-width electric pulse A$_1$, and this point is made the reference point (τ=0) of the delay time τ. The waveforms A$_2$, A$_3$, . . . detected after the short-width pulse A$_1$ are reflected waves. The reflected waves A$_2$, A$_3$ are deemed to be ones produced at the junction between the signal transmission line J1 and the circuit to be measured DUT in view of the reflection times of them. A reflected wave arriving after the reflected wave A$_3$, for example, A$_4$ is the reflected wave produced in the inside of the circuit to be measured DUT, and it is possible based on the delay time τ$_x$ of the reflected wave A$_4$ to estimate the distance from the input point of the circuit to be measured DUT to the reflection point.

The maximum value of the delay time τ is given by the maximum value of traveling distance of the movable mirror 202A. Assuming that the maximum value of traveling distance is, for example, 50 mm, the maximum value τ$_{max}$ of the delay time is:

$$\tau_{max} = 2 \times 50 \times 10^{-3}/3 \times 10^8 \quad = 3.333 \times 10^{10} \text{ (sec)}$$
$$= 333.3 \text{ (psec)}$$

The resolution of reading (one step Δτ of the delay time) is determined by the distance of one traveling step of the movable mirror 202A. For example, assuming that one traveling step is 0.5 μm, one step Δτ of the delay time is:

$$\Delta\tau = 2 \times 0.5 \times 10^{-6}/3 \times 10^8 \quad = 3.333 \times 10^{-15} \text{ (sec)}$$
$$= 3.333 \text{ (fsec)}$$

That is, it is possible to sample the waveform produced during the time duration of 333.3 (psec) with the resolution of 3.333 (fsec) and to take out the waveform data.

Figure 4:
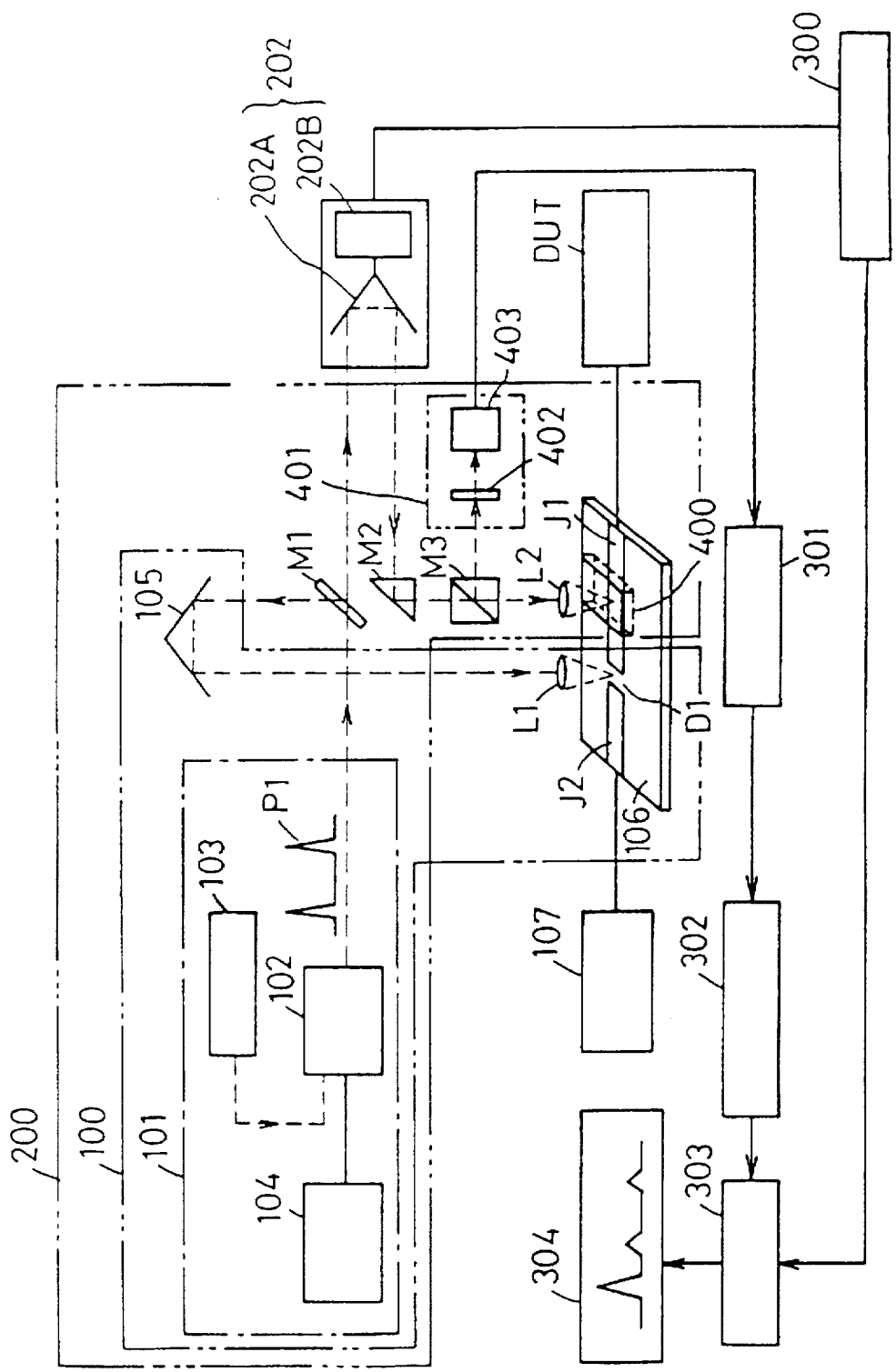
FIG. 4 is a block diagram showing second embodiment of the reflection point measuring apparatus according to the present invention.

FIG. 4 shows second embodiment of the reflection point measuring apparatus according to the present invention. This second embodiment is constructed by a combination of the short-width pulse generating apparatus 100 for use in measurement of a reflection point according to the first aspect of the present invention and a sampling apparatus 200 for use in measurement of a reflection point according to the third aspect of the present invention.

As shown in FIG. 4, one embodiment of the sampling apparatus according to the third aspect of the present invention comprises an electro-optical element 400 contacted with the signal transmission line or path J1 and a polarization intensity detecting means 401 for detecting an intensity or strength of polarization of a transmitted optical probe pulse P2 given by the photoelectric element 400. The polarization intensity detecting means 401 comprises an analyzer 402 and a photodetector 403.

An electro-optical crystal such as zinc-tellurium (ZnTe) may be used as the electro-optical element 400, and an electric field produced on the signal transmission line J1 is applied to the electro-optical element 400 by contacting the bottom surface of the electro-optical element 400 with the signal transmission line J1. Like the first embodiment of the present invention mentioned above, the optical probe pulse P1 having transmitted the semitransparent mirror M1 is delayed and reflected as the delayed optical probe pulse P2 by the variable delay means 202, and is further reflected by a reflecting mirror M2 in the downward direction substantially perpendicular to the incident light path. The delayed optical probe pulse P2 transmits a semitransparent mirror (or polarizing prism) M3 and then is converged by the condenser lens L2 to irradiate the electro-optical element 400. The optical probe pulse P2 is reflected at the bottom of the electro-optical element 400 to which the electric field produced on the signal transmission line J1 is applied so that the optical probe pulse P2 is polarized by the electric field. The polarized optical probe pulse P2 is reflected by the semi-transparent mirror M3 in the direction substantially perpendicular to the incident light path and is incident on the polarization intensity detecting means 401 where it is converted into an electric signal corresponding to the intensity of the polarization thereof. The electric signal detected by the polarization intensity detecting means 401 is inputted into the detector 301, and thereafter it is converted into a digital signal which is entered into the arithmetic unit 303 as the waveform data by the same operation as mentioned above in relation to the first embodiment.

Figure 5:
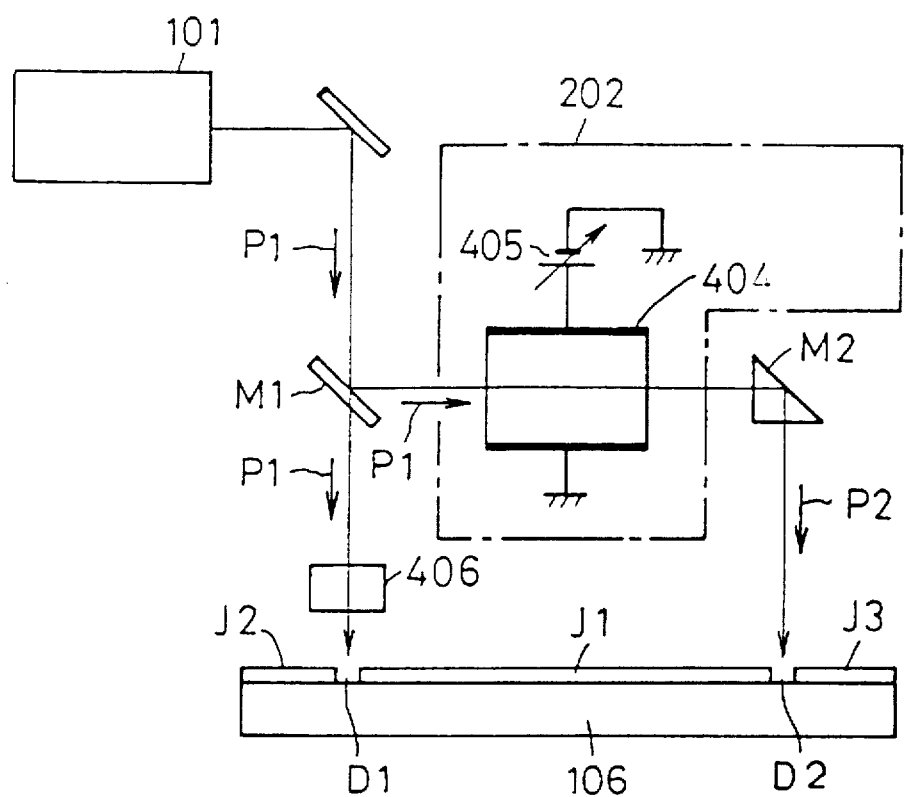
FIG. 5 is a side view showing another example of the variable delay means used in the respective reflection point measuring apparatus shown in FIGS. 1 and 4.

FIG. 5 shows another example of the variable delay means 202. In this example, instead of the movable mirror, an optical modulator 404 is used to construct the variable delay means 202. As described above, an optical probe pulse P1 emitted from the short-width optical pulse generating means 101 is split into two optical pulses (light beams) by the semitransparent mirror M1, and the transmitted optical probe pulse P1 propagates on the straight and transmits a high-n material 406 to irradiate the first photoelectric conversion means D1. Here, the high-n material means a material having high refractive index or refractivity which operates as a fixed delay element for delaying an optical pulse or light by a fixed delay time. This high-n material 406 is provided so that the time that the transmitted optical probe pulse P1 arrives at the first photoelectric conversion means D1 can be later than the time that the reflected optical probe pulse P1 arrives at the first photoelectric conversion means D2.

The reflected optical probe pulse P1 is incident on the optical modulator 404 which constructs the variable delay means 202. To the optical modulator 404 is applied, in this example, a control voltage from a control voltage source 405 thereby giving an electric field to an electro-optical element which constructs the optical modulator 404. The optical probe pulse P1 passing through the optical modulator 404 is delayed by varying the electric field step by step.

In this way, in case of utilizing the optical modulator 404 as the variable delay means 202, there is no need for using the movable mirror 202A as in the embodiment shown in FIG. 1 or FIG. 4, and as a result, any mechanically movable portion or member is not necessary. Accordingly, there are obtained advantages that the time needed to alter the delay time τ can be reduced and the measuring speed can be accelerated or quickened.

Figure 6:
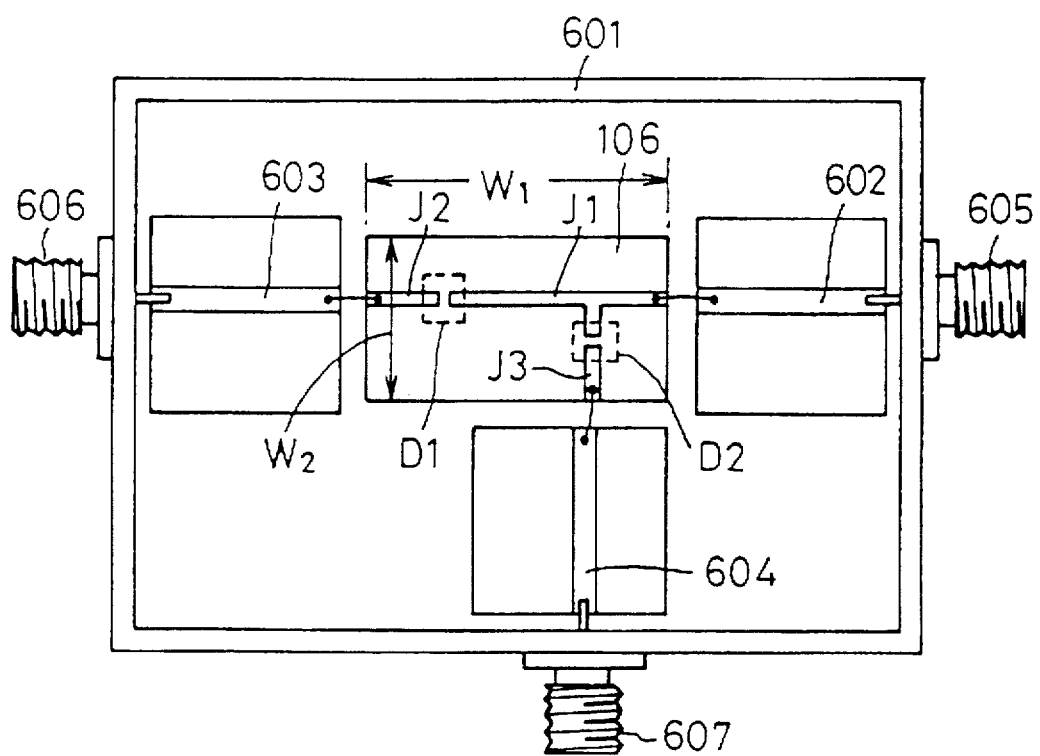
FIG. 6 is a plan view showing an mounting structure of the photoelectric conversion means used in the respective reflection point measuring apparatus shown in FIGS. 1 and 4.

FIG. 6 shows an example of mounting of the semi-insulating substrate 106 which constructs the photoelectric conversion means D1 and D2. The semi-insulating substrate 106 is formed into a shape having its length (long side) $W_1$ of about 2 mm and its width (short side) $W_2$ of about 1 mm, and is mounted in a shield casing 601 at about central portion thereof. Microstrip lines 602, 603, 604 are connected to the signal transmission line J1, the voltage applied electrode J2, the signal pick-up electrode J3 formed on the semi-insulating substrate 106, respectively, which are connected to connectors 605, 606, 607 attached to the shield casing 601 through the microstrip lines 602, 603, 604, respectively. The measurement of a reflection point can be performed by connecting a circuit to be measured DUT to the connector 605, a voltage source to the connector 606, and the apparatus including the detector 301 and the like to the connector 607, respectively. Further, in case that the shape or size of the circuit to be measured, the circuit to be measured DUT may be mounted to the position in which the microstrip line 602 exists.

Figure 7:
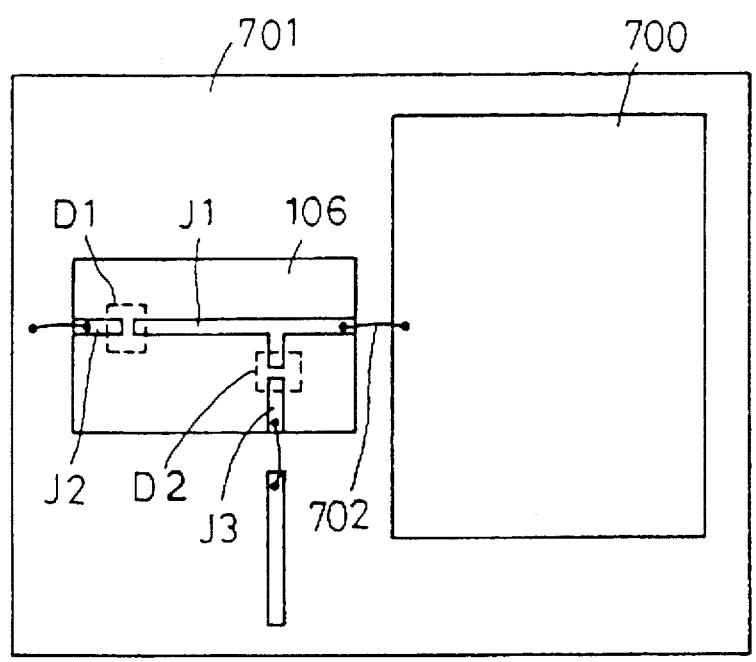
FIG. 7 is a plan view showing another mounting structure of the photoelectric conversion means used in the respective reflection point measuring apparatus shown in FIGS. 1 and 4.

FIG. 7 shows a further example of mounting of the semi-insulating substrate 106. This mounting example is adapted to mount the semi-insulating substrate 106 in a package 701 of a hybrid IC (Integrated Circuit) or monolithic IC 700 whereby the hybrid IC or monolithic IC 700 can be directly tested using the photoelectric conversion means D1 and D2 formed on the semi-insulating substrate 106.

Figure 8:
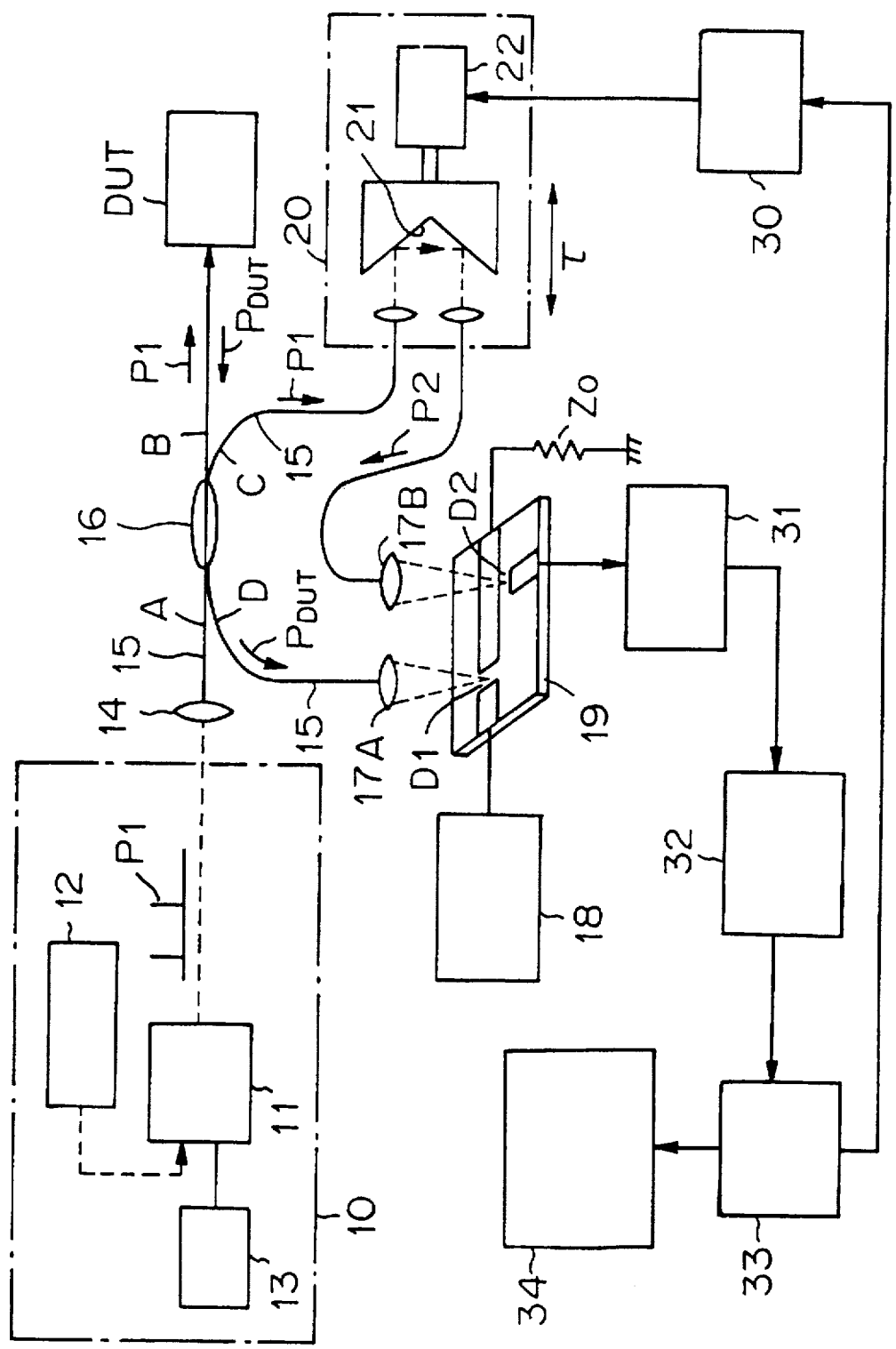
FIG. 8 is a block diagram showing third embodiment of the reflection point measuring apparatus according to the present invention.

FIG. 8 shows third embodiment of the reflection point measuring apparatus according to the present invention. A short-width optical pulse generating means 10 may have the same construction as that of the short-width optical pulse generating means 101 shown in FIGS. 1 and 4, and a semiconductor laser generator or other laser generators can be used as the short-width optical pulse generating means 10. In this embodiment is used a mode locking laser oscillator which comprises a main laser oscillator 11, an exciting or pumping laser oscillator 12, and a synchronizing circuit 13. A titanium-sapphire laser oscillator may be used as the main laser oscillator 11, and an argon laser oscillator may be used as the exciting laser oscillator 12. One example of such mode locking laser oscillator thus constructed contains the mode locking titanium-sapphire laser oscillator made by Spectra-Physics Laser Inc. in U.S.A. as described above. From this mode locking titanium-sapphire laser oscillator can be obtained an optical probe pulse P1 (FIG. 10A) having pulse repetition frequency of 80 MHz and pulse duration of 80 fs ($10^{-15}$ seconds).

An optical probe pulse P1 generated by the short-width optical pulse generating means 10 is converged by a condenser lens 14 and is incident on an optical transmission line or path 15. An optical fiber can be used as the optical transmission line 15. An object or circuit to be measured DUT is coupled to the terminal end of the optical transmission line 15. A reflected light acquisition means 16 is disposed in the intermediate portion of the optical transmission line 15. As the reflected light acquisition means 16, an optical coupler generally referred to as an optical fiber coupler can be used. The optical coupler is adapted to split an incident optical probe pulse P1 from an input terminal A into two optical probe pulses which are outputted to output terminal B and C, respectively, and also to output a reflected light or optical pulse $P_{DUT}$ (FIG. 10B) to an output terminal D, which is reflected at the object to be measured DUT and is entered into the optical coupler.

The reflected light $P_{DUT}$ taken out to the output terminal D is incident on a condenser lens 17A through the optical transmission line of an optical fiber. The condenser lens 17A converges light outputted from the optical transmission line 15 and irradiates a first photoelectric conversion means D1.

Figure 9:
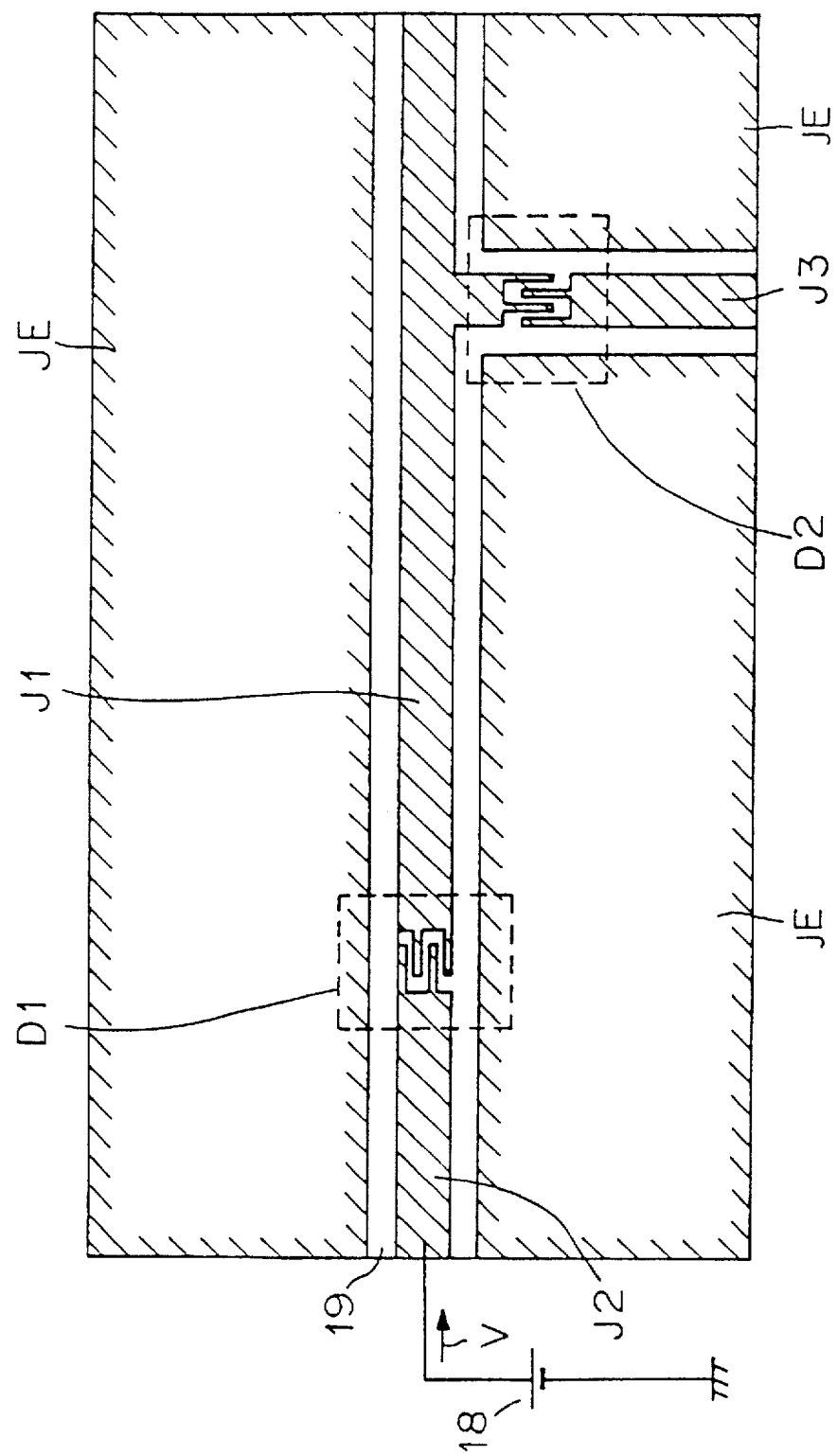
FIG. 9 is an enlarged plan view showing one example of the first and second photoelectric conversion means used in the reflection point measuring apparatus shown in FIG. 8.

The first photoelectric conversion means D1 may be composed of, for example, a semi-insulating substrate 19 which comprises an insulating substrate made of, for example, indium-phosphorus (InP) or the like into which a small quantity of iron (Fe) is doped. The semi-insulating substrate 19 has strip-like electrically conductive patterns J1 and J2 on the one surface at the central portion thereof. These strip-like conductive patterns J1 and J2 are disposed in the lengthwise direction of the semi-insulating substrate 19 with a predetermined gap therebetween and in alignment with each other. As shown in FIG. 9 in enlarged size, these conductive patterns J1 and J2 have comb-like (pectinated) shapes on their opposing portions, respectively, so that each pattern can have an increased area to be irradiated with light by interlocking the teeth of both the comb-like shapes. Here, the conductive pattern J1 is referred to as a signal transmission line (path) or signal conductor.

The gap between the signal transmission line J1 and the conductive pattern J2 becomes electrically conductive when light is irradiated on the gap. Therefore, by applying a DC voltage V to the conductive pattern J2 from a DC power supply 18 and irradiating the opposing portions having the comb-like shapes with the reflected light $P_{DUT}$, electric pulse signals $W_1$, $W_2$, $W_3$, . . . (FIG. 10G) having peak values corresponding to the DC voltage V and the intensity or strength of the reflected light $P_{DUT}$ are produced on the signal transmission line J1. The pulse durations or widths of the electric pulse signals $W_1$, $W_2$, $W_3$, . . . can be made extremely short durations since the pulse duration or width of the optical probe pulse P1 is extremely short or narrow due to the structure of the first photoelectric conversion means D1. An electric pulse signal having an extremely short pulse duration, for example, the full width at half maximum of which is of the order of 0.1 to 1 ps can be obtained. Further, each of grounded conductors is denoted by JE in FIG. 9. Such configuration that grounded conductors JE are disposed on both sides of the signal transmission line J1 causes the signal transmission line J1 and the conductive patterns J2, J3 to constitute a coplanar line structure so that the characteristic impedance of the signal transmission line J1 can have a predetermined one $Z_0$.

The optical probe pulse P1 taken out to the output terminal C of the optical fiber coupler which serves as the reflected light acquisition means 16 is incident on a variable delay means 20 through the optical transmission line 15. The variable delay means 20 has the same construction as the variable delay means 202 described above, and comprises a movable mirror 21 and a stage driver 22 for driving the movable mirror 21. The stage driver 22, in response to a timing signal supplied from a controller 30, reciprocatingly moves the movable mirror 21 step by step or continuously in the direction parallel to the direction that the optical probe pulse P1 propagates thereby varying the delay time τ given to the optical probe pulse P1 step by step or continuously. In other words, the timing of sampling is gradually shifted in the direction of the time base. Further, for the purpose of easy understanding of explanation, hereinafter the case the movable mirror 21 is moved step by step will be described.

The optical probe pulse P2 delayed by the variable delay means 20 is converged by a condenser lens 17B to irradiate a second photoelectric conversion means D2. This second photoelectric conversion means D2 comprises, in this embodiment, a short branch line or path branched perpendicularly from the signal transmission line J1, and a strip-like signal pick-up electrode J3 disposed in alignment with the short branch line with a predetermined gap therebetween as shown in FIG. 9 in enlarged size. Similar to the first photoelectric conversion means D1, these short branch line and signal pick-up electrode J3 have comb-like (pectinated) shapes on their opposing portions, respectively, so that each of them can have an increased area to be irradiated with light by interlocking the teeth of both the comb-like shapes.

The gap between the short branch line and the signal pick-up electrode J3 becomes electrically conductive when light is irradiated on the gap. Therefore, by the second photoelectric conversion means D2 being irradiated with the optical probe pulse P2, the electric potential on the signal transmission line J1 at the time that the second photoelectric conversion means D2 has been irradiated with the optical probe pulse P2 (at the delayed timing) is taken out on the signal pick-up electrode J3 whereby the electric potential is sampled.

The sampled voltage signal taken out on the signal pick-up electrode J3 is detected by a detector 31 which may be, for example, a lock-in amplifier or the like, and the detected voltage signal is converted into a digital signal by an analog-digital (A/D) converter 32, which is supplied to an arithmetic unit 33 where the digital signal undergoes a de-convolution process to restore to the original waveform data on the time base, and is displayed on a display 34.

Figure 10:
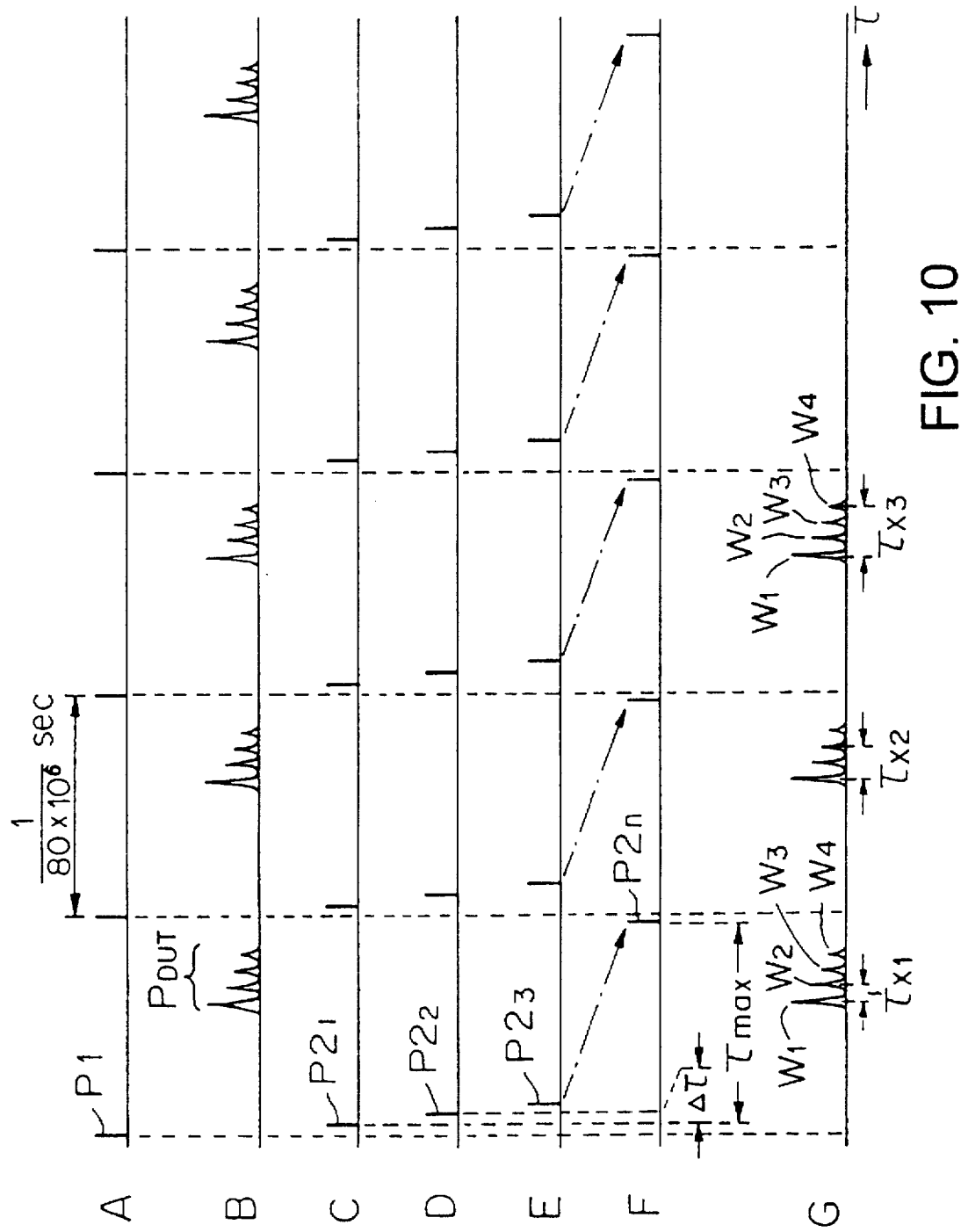
FIG. 10 is waveforms for explaining the operation of the reflection point measuring apparatus shown in FIG. 8.

FIGS. 10C to 10F show a manner of sampling. FIG. 10C shows a state in which a delay time Δτ is given to the optical probe pulse P1 at the position where the movable mirror 21 has moved by one step from the starting position. The optical probe pulse to which the delay time Δτ is given is indicated by a character $P2_1$. This optical probe pulse $P2_1$ continues to irradiate the second photoelectric conversion means D2 so that the electric potential on the signal transmission line J1 at the time delayed by Δτ is continuously sampled and the sampled electric potential is continuously inputted into the detector 31. The detector 31 may be a lock-in amplifier or the like as mentioned above, and the detected output (analog signal) is supplied to the A/D converter 32 where it is converted into a digital signal thereby deciding the value of waveform data at the delay time Δτ.

When the A/D converter 32 has completed the operation of A/D conversion, the controller 30 outputs a command for altering the delay time to the variable delay means 20. The variable delay means 20 moves the movable mirror 21 by further one step to the next time delay position. The pulse $P2_2$ in FIG. 10D shows an optical probe pulse to which the delay time 2Δτ is given at the next stop position of the movable mirror (the next time delay position). When this optical probe pulse $P2_2$ is given to the second photoelectric conversion means D2, the output of the detector 31 is supplied to the A/D converter 32 where the value of waveform data at the delay time 2Δτ is converted into a digital signal and is put in the arithmetic unit 33.

Thereafter, the above-mentioned operation is repeated by sequentially moving the movable mirror 21 step by step until the maximum time delay position thereof, and the maximum delay time $\tau_{max}$ at the maximum time delay position is given to the optical probe pulse P1 whereby the optical probe pulse $P2_n$ to which the maximum delay time $\tau_{max}$ is given is emitted from the variable delay means 22. The optical probe pulse $P2_n$ irradiates the second photoelectric conversion means D2, and the value of waveform data at that time is converted into a digital signal by the A/D converter 32 which is entered into the arithmetic unit 33.

The arithmetic unit 33 joins together the waveform data at respective delayed timings which are converted into digital signals by the A/D converter 32, and performs a de-convolution process of them to restore to the waveform data on the original time base, and displays them on the display 34 as the waveform on the time base.

FIG. 10G shows an electric pulse waveform of the reflected light $P_{DUT}$ which has been restored to the waveform data on the original time base. The illustrated example shows a state in which reflected waves $W_1$, $W_2$, $W_3$, $W_4$, have been produced. The first reflected wave $W_1$ is deemed to be one produced at the junction between the optical transmission line 15 and the object to be measured DUT. The reflected waves $W_2$, $W_3$, $W_4$ successively produced after the first reflected wave $W_1$ are deemed to be the reflected waves produced in the inside of the object to be measured DUT. Accordingly, if the time position corresponding to the peak point of the reflected wave $W_1$ is made the reference point, it is possible based on the time interval $\tau_{x1}$ between $W_1$ and $W_2$ to estimate the distance from the input point of the object to be measured DUT to the first reflection point. In like manner, it is possible based on the time interval $\tau_{x2}$ between $W_1$ and $W_3$ and the time interval $\tau_{x3}$ between $W_1$ and $W_4$ to estimate the distances from the input point of the object to be measured DUT to the second and the third reflection points.

The maximum value of the delay time τ is given by the maximum value of traveling distance of the movable mirror 21. Assuming that the maximum value of traveling distance is, for example, 50 mm, the maximum value $\tau_{max}$ of the delay time is:

$$\tau_{max} = 2 \times 50 \times 10^{-3}/3 \times 10^8 \quad = 3.333 \times 10^{10} \text{ (sec)}$$
$$= 333.3 \text{ (psec)}$$

The resolution of reading (one step $\Delta\tau$ of the delay time) is determined by the distance of one traveling step of the movable mirror 21. For example, assuming that one traveling step is 0.5 µm, one step $\Delta\tau$ of the delay time is:

$$\Delta\tau = 2 \times 0.5 \times 10^{-6}/3 \times 10^8 \quad = 3.333 \times 10^{-15} \text{ (sec)}$$
$$= 3.333 \text{ (fsec)}$$

That is, it is possible to sample the waveform produced during the time duration of 333.3 (psec) with the resolution of 3.333 (fsec)=3.333×10⁻¹⁵ (sec) and to take out the waveform data.

Figure 11:
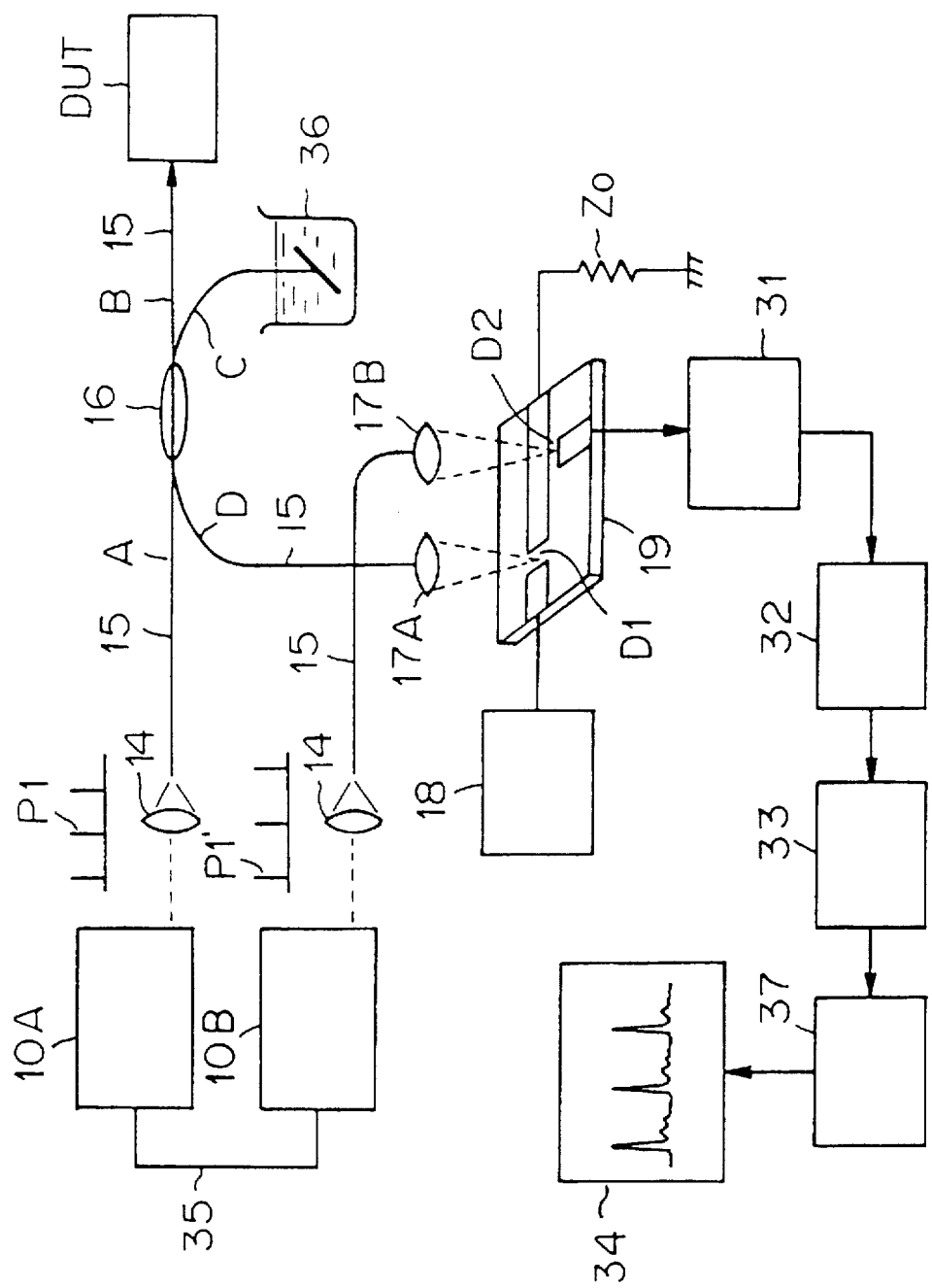
FIG. 11 is a block diagram showing fourth embodiment of the reflection point measuring apparatus according to the present invention.

FIG. 11 shows fourth embodiment of the reflection point measuring apparatus according to the present invention. This fourth embodiment is so constructed that the timing of sampling can be gradually shifted in the direction of the time base without using the variable delay means 20.

In this embodiment are provided two short-width optical pulse generating means 10A and 10B. These short-width optical pulse generating means 10A and 10B are set to generate optical probe pulses P1 and P1' having slightly different frequencies from each other, respectively. For example, assuming that the first short-width optical pulse generating means 10A generates the optical probe pulse P1 frequency of which is 80 MHz, frequency of the optical probe pulse P1' generated by the second short-width optical pulse generating means 10B is selected to be about (80 MHz–10 Hz) to (80 MHz–100 Hz). At the same time, a synchronizing circuit 35 is connected between these short-width optical pulse generating means 10A and 10B thereby synchronizing both oscillations thereof with each other. In other words, a difference is given between oscillation frequencies of the optical pulse generating means 10A and 10B, and the oscillating conditions thereof are synchronized with each other. As a result, the optical probe pulses P1 and P1' generated by both the generating means are synchronized (coincide in their phases) at time intervals of the period defined by the frequency difference therebetween.

The reflected light acquisition means 16 serves to input the optical probe pulse PI generated by the first short-width optical pulse generating means 10A into the object to be measured DUT through the optical transmission line 15. The reflected light from the object to be measured DUT is acquired by the reflected light acquisition means 16 and the acquired reflected light is supplied to the first photoelectric conversion means D1 to irradiate it. At the same time, the optical probe pulse P1' generated by the second short-width optical pulse generating means 10B is given through the optical transmission line 15 to the second photoelectric conversion means D2 for sampling to irradiate it. Further, to the output terminal C is mounted a reflectionless termination means 36 which acts to absorb any optical probe pulse taken out to the output terminal C.

Figure 12:
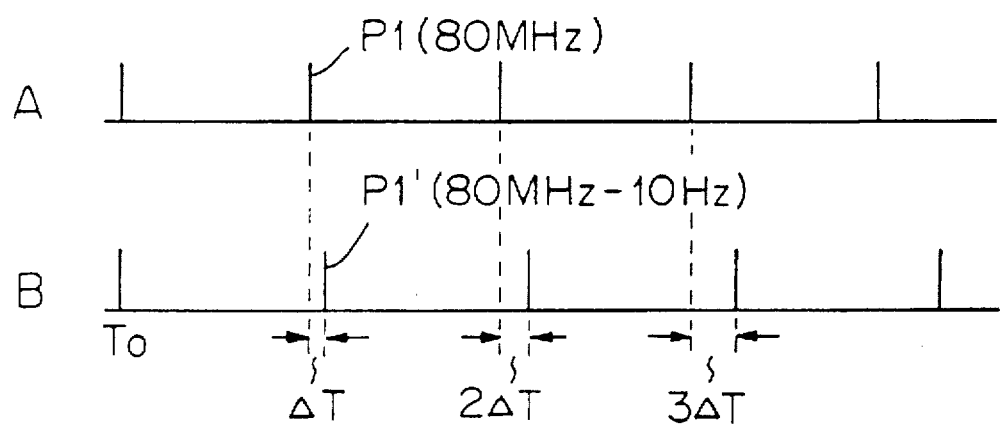
FIG. 12 is waveforms for explaining the operation of the reflection point measuring apparatus shown in FIG. 11.

As is constructed thus, since the optical probe pulse P1' which irradiates the second photoelectric conversion means D2 has its frequency slightly different from the frequency of the other optical probe pulse P1 which irradiates the first photoelectric conversion means D1, the phase difference between both the optical probe pulses P1 and P1' continue to increase a slight time duration $\Delta T$ by $\Delta T$ from the time point $T_O$ at which both the probe pulses P1 and P1' have been synchronized with each other (have coincided in phase), as shown in FIG. 12. The example in FIG. 12 shows a case that the frequency of the optical probe pulse P1' is selected to be slightly lower than the frequency of the optical probe pulse P1. Therefore, due to the frequency difference therebetween, the phase of the optical probe pulse P1' is shifted step by step in the lagging manner relative to the phase of the optical probe pulse P1. As illustrated in FIG. 12, in case that the frequency of the optical probe pulse P1 is selected to be 80 MHz and the frequency of the optical probe pulse P1' is selected to be (80 MHz–10 Hz), an amount of phase shift $\Delta T$ is as follows:

$$\Delta T = \lambda_1 - \lambda_2$$
$$= 1/(80 \text{ MHz} - 10 \text{ Hz}) - 1/80 \text{ MHz}$$
$$= 0.1 \text{ µs}$$

That is to say, a sampling with the resolution of 0.1 µs is possible.

According to the fourth embodiment, there is obtained an advantage that the movable type variable delay means 20 is unnecessary.

Now, assuming that the frequency of the optical probe pulse P1 is 80 MHz and the frequency of the optical probe pulse P1' is (80 MHz–10 Hz), to the detector 31 are inputted at the period of 10 times for a second the result obtained by sampling the time duration of 1/80 MHz with the resolution of 1/(80 MHz–10 Hz). An oscillograph may be connected to the output of the detector 31 to observe the waveform of the reflected wave. In the embodiment shown in FIG. 11, the output detected by the detector 31 is converted by the A/D converter 32 into a digital signal which is arithmetically processed by the arithmetic unit 33 whereby a distance is computed based on the delay time $\tau_{x1}$ from the peak point of a reflected wave produced at the input port of the object to be measured DUT, for example, the reflected wave $W_1$ shown in FIG. 10G to the next following reflected wave $W_2$, or the intensity of the peak point of a reflected wave or a ratio of the peak intensities between two reflected waves or the like is computed. The computed data is supplied to a controller 37 which outputs the waveform signal to the display 34 to display the reflected waveform. In addition to display of the waveform, the distance data and the like computed by the arithmetic unit 33 can be displayed. Further, though the case that the frequency of the optical probe pulse P1' is selected to be slightly lower than the frequency of the optical probe pulse P1 is explained, it is no problem that the frequency of the optical probe pulse P1' is selected to be slightly higher than the frequency of the optical probe pulse P1.

Figure 13:
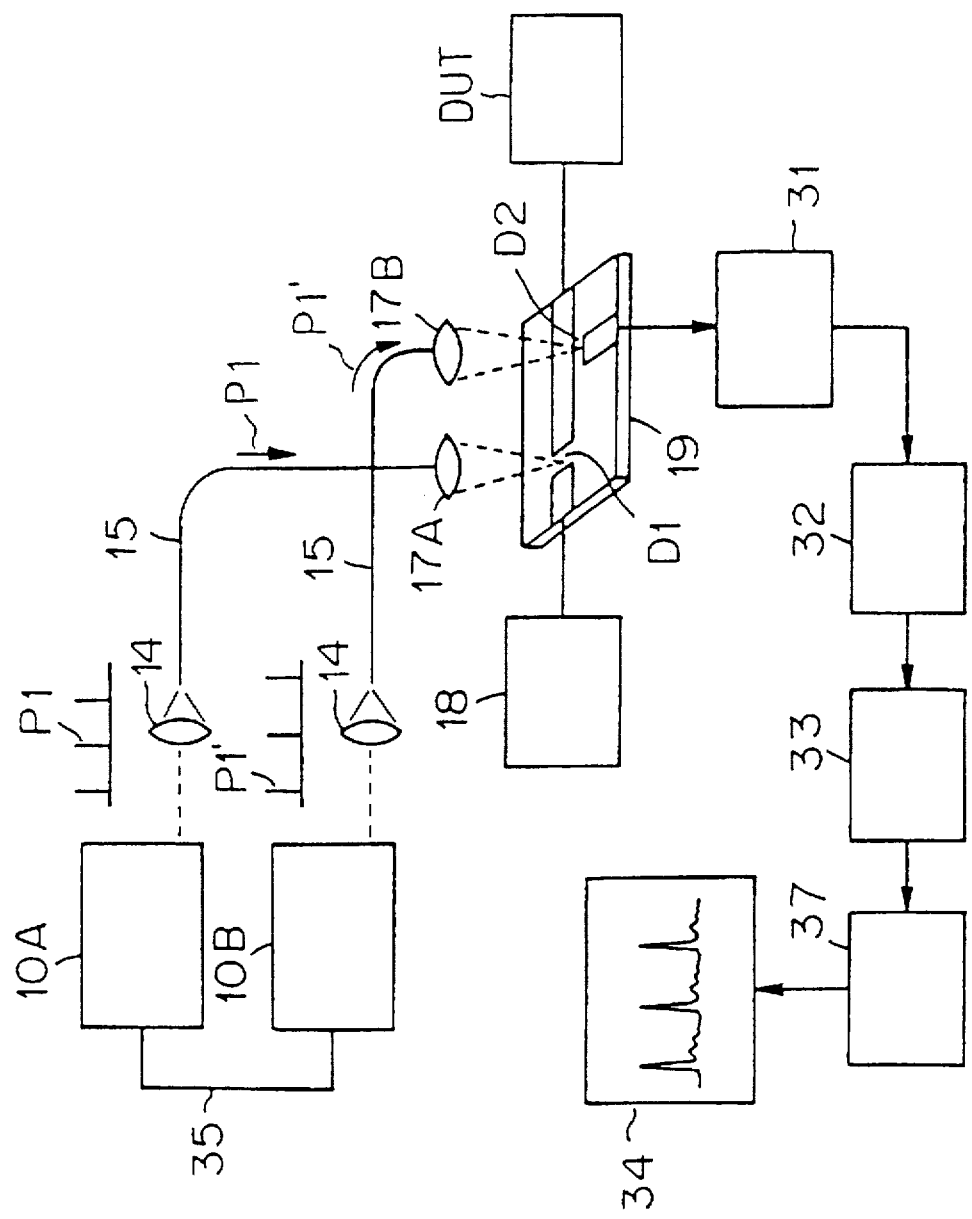
FIG. 13 is a block diagram showing fifth embodiment of the reflection point measuring apparatus according to the present invention.

FIG. 13 shows fifth embodiment of the reflection point measuring apparatus according to the present invention in which the object to be measured DUT in the fourth embodiment is an electric circuit. In this case, except that it is constructed to directly irradiate the first photoelectric conversion means D1 with the optical probe pulse P1 generated by the first short-width optical pulse generating means 10A and to input a short-width electric pulse signal produced at the time of such irradiation of the optical probe pulse P1 into an electrical input terminal of the object to be measured DUT through the signal transmission line J1, the remaining construction of the measuring apparatus is the same as that of the fourth embodiment shown in FIG. 11.

Figure 14:
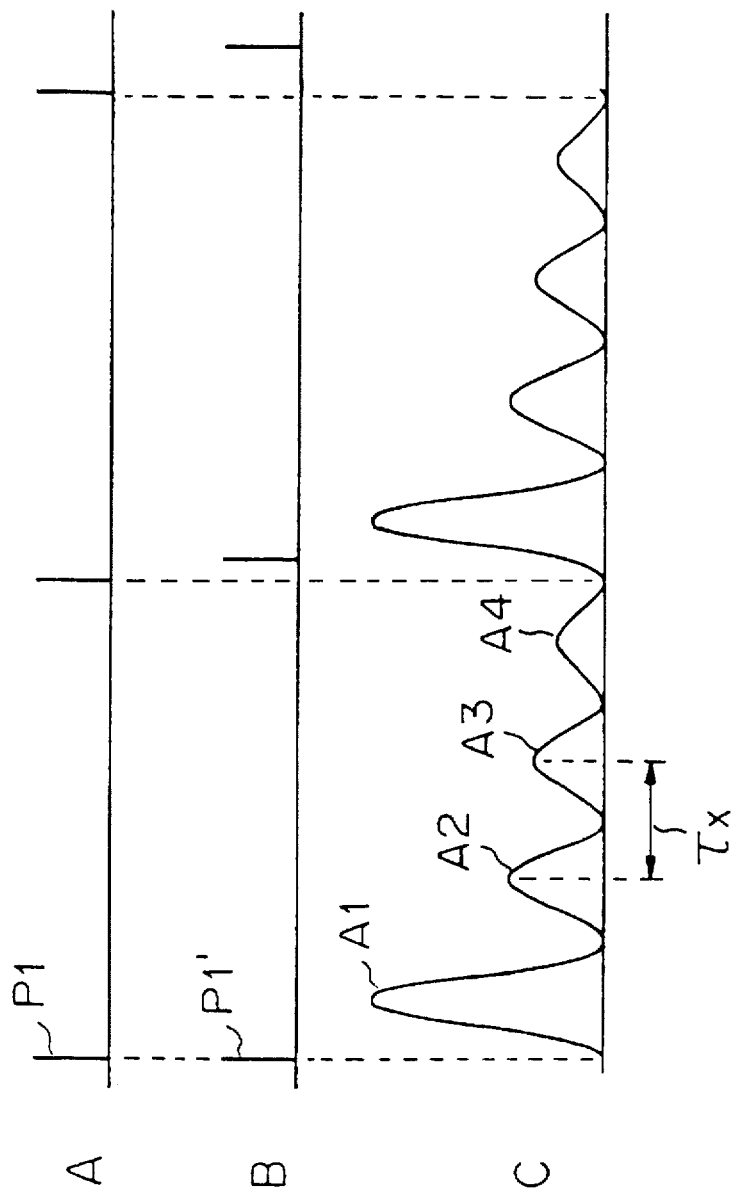
FIG. 14 is waveforms for explaining the operation of the reflection point measuring apparatus shown in FIG. 13.

Like the above-mentioned fourth embodiment, the optical probe pulse P1' irradiates the second photoelectric conversion means D2 which serves as a sampling means, since the optical probe pulse P1' has its frequency slightly different from the frequency of the other optical probe pulse P1, the phase difference between both the optical probe pulses P1 and P1' continue to gradually increase from the time point at which both the probe pulses P1 and P1' have been synchronized with each other (have coincided in phase), as explained in FIG. 12, so that the timing of sampling by the optical probe pulse P1' is gradually shifted. As a result, it is possible to sample a signal produced by the irradiation of the first photoelectric conversion means D1 with the optical probe pulse P1 and the reflected wave reflected back from the object to be measured DUT, respectively, to take out the sampled signals to the detector 31. FIG. 14C shows such signal waveform. In FIG. 14, A1 shows a short-width electric pulse produced by the irradiation of the first photoelectric conversion means D1 with the optical probe pulse P1, and A2, A3, A4 show reflected waves produced from the object to be measured DUT, respectively. Since the reflected wave A2 can be deemed to be one which is produced at the input port of the object to be measured DUT, a distance between the input port of the object to be measured DUT and the first reflection produced point in the object to be measured DUT can be estimated by measuring the time duration $\tau_x$ from the peak point of the reflected wave A2 to the peak point of the next following reflected wave A3. Thus, it is possible to measure the position of the reflected point on the electric circuit.

Figure 15:
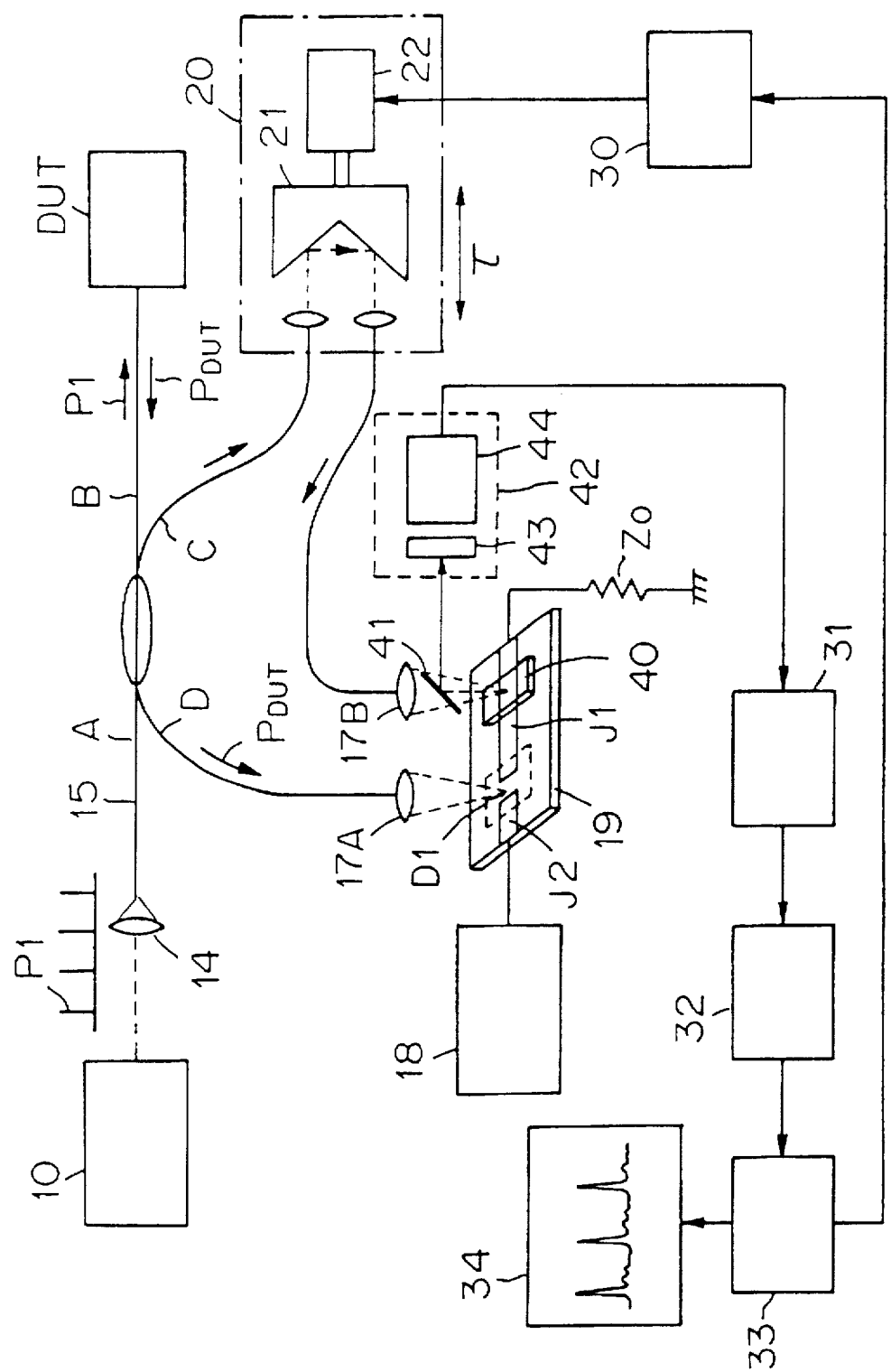
FIG. 15 is a block diagram showing sixth embodiment of the reflection point measuring apparatus according to the present invention.

FIG. 15 shows sixth embodiment of the reflection point measuring apparatus according to the present invention. This sixth embodiment differs in sampling portion from the third embodiment shown in FIG. 8. A sampling means shown in the sixth embodiment comprises an electro-optical element 40 contacted with the signal transmission line J1 and a semitransparent mirror (or polarizing prism) 41 for reflecting the optical probe pulse P2 reflected at the electro-optical element 40 toward polarization intensity detecting means 42 which detects an intensity or strength of polarization of the optical probe pulse P2. The polarization intensity detecting means 42 comprises an analyzer 43 and a photodetector 44.

An electro-optical crystal such as zinc-tellurium (ZnTe) may be used as the electro-optical element 40, and an electric field produced on the signal transmission line J1 is applied to the electro-optical element 40 by contacting the bottom surface of the electro-optical element 40 with the signal transmission line J1. The optical probe pulse P2 delayed and reflected by the variable delay means 20 is converged by the condenser lens 17B and then transmits the semitransparent mirror M3 to irradiate the electro-optical element 40. The optical probe pulse P2 is reflected at the bottom of the electro-optical element 40 to which the electric field produced on the signal transmission line J1 is applied so that the optical probe pulse P2 is polarized by the electric field. The polarized optical probe pulse P2 is reflected by the semitransparent mirror M3 in the direction substantially perpendicular to the incident light path and is incident on the polarization intensity detecting means 42 where it is converted into an electric signal corresponding to the intensity of the polarization thereof. The electric signal detected by the polarization intensity detecting means 42 is inputted into the detector 31, and thereafter it is converted by the A/D converter 32 into a digital signal which is entered into the arithmetic unit 33 as the waveform data by the same operation as mentioned above. The construction of this sampling means can be applied to the third, the fourth and the fifth embodiments shown in FIGS. 8, 11 and 13, respectively.

EFFECTS OF THE INVENTION

As described above, according to the present invention, a short-width electric pulse the full width at half maximum of which is extremely narrow, for example, of the order of 0.1 to 1 ps can be generated, and therefore, the distant resolution L is as follows:

$$L = 0.3 \times 10-12(s) \times \text{velocity of light (m/s)} = 0.03 \times 1/\sqrt{\epsilon} \text{ mm}$$

$$L = 3.0 \times 10-12(s) \times \text{velocity of light (m/s)} = 0.3 \times 1/\sqrt{\epsilon} \text{ mm}$$

Since the highest resolution is about $0.03 \times 1/\sqrt{\epsilon}$ mm and the lowest resolution is about $0.3 \times 1/\sqrt{\epsilon}$ mm, a reflection point can be specified or identified with a resolution within the above-indicated range. Accordingly, even in case of an integrated high frequency circuit, a reflection point produced in the inside thereof can be specified with high accuracy so that a trouble or defect of the circuit can easily be found and any change in design of the circuit can be done with ease. Therefore, a development of an apparatus can be performed within a short period of time.

Also, according to the present invention, it is possible to generate an optical pulse having an extremely narrow pulse width, and to input the optical pulse into an object to be measured and to measure a reflected light wave produced in the object to be measured, and thus the distance from the input port of the object to be measured to the reflection point produced in the inside of the object can be measured with high resolution. Moreover, in case of using two optical probe pulses having slightly differing in frequency from each other, it is unnecessary to use any variable delay means which is mechanically driven. As a result, the whole measuring apparatus can be miniaturized and also can be made a light weight since any mechanically operated or driven parts or members need not be mounted to the measuring apparatus.

What is claimed is:

1. A short-width pulse generating apparatus for use in measurement of a reflection point comprising:
    short-width optical pulse generating means for repetitively generating an optical probe pulse having a narrow pulse width; and
    photoelectric conversion means comprising:
        a semi-insulating photoconductive substrate,
        a first and a second signal transmission lines disposed with a predetermined gap therebetween on one surface of said semi-insulating photoconductive substrate, said first signal transmission line being adapted to be supplied with a DC voltage, and
        means for irradiating an area including said predetermined gap of said semi-insulating photoconductive substrate with an optical probe pulse generated by said short-width optical pulse generating means, whereby a short-width electric pulse is produced on said second signal transmission line each time when said area including said predetermined gap of said semi-insulating photoconductive substrate is irradiated with an optical probe pulse generated by said short-width optical pulse generating means.

2. A sampling apparatus for use in measurement of a reflection point comprising:
    short-width optical pulse generating means for generating an optical probe pulse having a narrow pulse width;
    variable delay means for sequentially delaying an optical probe pulse generated by said short-width optical pulse generating means; and
    photoelectric conversion means comprising:
        a semi-insulating photoconductive substrate, a signal transmission line and a signal pick-up electrode disposed with a predetermined gap therebetween on one surface of said semi-insulating photoconductive substrate, and means for irradiating an area including said predetermined gap of said semi-insulating photoconductive substrate with an optical probe pulse delayed by said variable delay means, whereby an electric potential on said signal transmission line is taken out to said signal pick-up electrode each time when said area including said predetermined gap of said semi-insulating photoconductive substrate is irradiated with an optical probe pulse delayed by said variable delay means.

3. The sampling apparatus according to claim 2, wherein said signal transmission line has an extended portion substantially perpendicular thereto and said extended portion is disposed in alignment with said signal pick-up electrode with said predetermined gap.

4. A sampling apparatus for use in measurement of a reflection point comprising:

short-width optical pulse generating means for generating an optical probe pulse having a narrow pulse width;

variable delay means for sequentially delaying an optical probe pulse generated by said short-width optical pulse generating means;

an electro-optical element comprising a reflection surface for reflecting an optical probe pulse delayed by said variable delay means and incident thereon, and coupled to a signal transmission line through which an electric signal reflection from an object to be measured propagates, said electro-optical element changing the polarization of the delayed optical probe pulse depending upon an intensity of an electric field produced about said signal transmission line while the delayed optical probe pulse is incident on said electro-optical element and reflected from said reflection surface; and a photodetector on which an optical probe pulse reflected from said electro-optical element is incident and for detecting an amount of change in polarization of the optical probe pulse given by said electro-optical element and converting the amount of change in polarization into an electric signal.

5. A reflection point measuring apparatus comprising:

a short-width pulse generating apparatus for use in measurement of a reflection point comprising:

short-width optical pulse generating means for repetitively generating an optical probe pulse having a narrow pulse width, and first photoelectric conversion means comprising:

a semi-insulating photoconductive substrate;

a first and a second signal transmission lines disposed with a first predetermined gap therebetween on one surface of said semi-insulating photoconductive substrate, said first signal transmission line being adapted to be supplied with a DC voltage; and means for irradiating an area including said first predetermined gap of said semi-insulating photoconductive substrate with an optical probe pulse generated by said short-width optical pulse generating means, whereby a short-width electric pulse is produced on said second signal transmission line each time when said area including said first predetermined gap is irradiated with an optical probe pulse generated by said short-width optical pulse generating means; and a sampling apparatus for use in measurement of a reflection point comprising:

variable delay means for sequentially delaying an optical probe pulse generated by said short-width optical pulse generating means, and second photoelectric conversion means comprising:

said semi-insulating photoconductive substrate;

said second signal transmission line and a signal pick-up electrode disposed with a second predetermined gap therebetween on said one surface of said semi-insulating photoconductive substrate; and means for irradiating an area including said second predetermined gap of said semi-insulating photoconductive substrate with an optical probe pulse delayed by said variable delay means, whereby an electric potential on said second signal transmission line is taken out to said signal pick-up electrode each time when said area including said second predetermined gap is irradiated with an optical probe pulse delayed by said variable delay means.

6. The reflection point measuring apparatus according to claim 5, wherein said second signal transmission line has an extended portion substantially perpendicular thereto and said extended portion is disposed in alignment with said signal pick-up electrode with said second predetermined gap.

7. A reflection point measuring apparatus comprising:

a short-width pulse generating apparatus for use in measurement of a reflection point comprising:

short-width optical pulse generating means for repetitively generating an optical probe pulse having a narrow pulse width, and photoelectric conversion means comprising:

a semi-insulating photoconductive substrate;

a first and a second signal transmission lines disposed with a first predetermined gap therebetween on one surface of said semi-insulating photoconductive substrate, said first signal transmission line being adapted to be supplied with a DC voltage; and means for irradiating an area including said first predetermined gap of said semi-insulating photoconductive substrate with an optical probe pulse generated by said short-width optical pulse generating means, whereby a short-width electric pulse is produced on said second signal transmission line each time when said area including said first predetermined gap is irradiated with an optical probe pulse generated by said short-width optical pulse generating means; and a sampling apparatus for use in measurement of a reflection point comprising:

variable delay means for sequentially delaying an optical probe pulse generated by said short-width optical pulse generating means, an electro-optical element comprising with a reflection surface for reflecting an optical probe pulse delayed by said variable delay means and incident thereon, and coupled to said second signal transmission line through which an electric signal reflected from an object to be measured propagates, said electro-optical element changing the polarization of the delayed optical probe pulse depending upon an intensity of an electric field produced about said second signal transmission line while the delayed optical probe pulse is incident on said electro-optical element and reflected from said reflection surface, and a photodetector on which an optical probe pulse reflected from said electro-optical element is incident and for detecting an amount of change in polarization of the optical probe pulse given by said electro-optical element and converting the detected amount of change in polarization into an electric signal.

8. A reflection point measuring apparatus comprising:

short-width optical pulse generating means for generating an optical probe pulse having a narrow pulse width;

an optical transmission line for directing an optical probe pulse generated by said short-width optical pulse generating means to be incident on an object to be measured;

reflected light acquisition means for receiving a reflected light reflected from said object and returned to said optical transmission line;

first photoelectric conversion means comprising:
a semi-insulating photoconductive substrate,
a first and a second signal transmission lines disposed with a first predetermined gap therebetween on one surface of said semi-insulating photoconductive substrate, said first signal transmission line being adapted to be supplied with a DC voltage, and
means for irradiating an area including said first predetermined gap of said semi-insulating photoconductive substrate with a reflected light supplied from said reflected light acquisition means, whereby short-width electric pulse is produced on said second signal transmission line each time when said area including said first predetermined gap is irradiated with a reflected light from said reflected light acquisition means; variable delay means for delaying an optical probe pulse generated by said short-width optical pulse generating means; and second photoelectric conversion means comprising:
said semi-insulating photoconductive substrate,
said second signal transmission line and a signal pick-up electrode disposed with a second predetermined gap therebetween on said one surface of said semi-insulating photoconductive substrate, and
means for irradiating an area including said second predetermined gap of said semi-insulating photoconductive substrate with an optical probe pulse delayed by said variable delay means, whereby an electric potential on said second signal transmission line is taken out to said signal pick-up electrode each time when said area including said second predetermined gap is irradiated with an optical probe pulse delayed by said variable delay means.

9. The reflection point measuring apparatus according to claim 8, wherein said second signal transmission line has an extended portion substantially perpendicular thereto and said extended portion is disposed in alignment with said signal pick-up electrode with said second predetermined gap.

10. A reflection point measuring apparatus comprising:

a pair of short-width optical pulse generating means for generating two optical probe pulses having a narrow pulse width and slightly differing in frequency from each other;

an optical transmission line for directing an optical probe pulse generated by one of said pair of short-width optical pulse generating means to be incident on an object to be measured;

reflected light acquisition means for receiving a reflected light of an optical probe pulse which has been incident on said object;

first photoelectric conversion means comprising:
a semi-insulating photoconductive substrate,
a first and a second signal transmission lines disposed with a first predetermined gap therebetween on one surface of said semi-insulating photoconductive substrate, said first signal transmission line being adapted to be supplied with a DC voltage, and
means for irradiating an area including said first predetermined gap of said semi-insulating photoconductive substrate with a reflected light of an optical probe pulse supplied from said reflected light acquisition means, whereby a short-width electric pulse is produced on said second signal transmission line each time when said area including said first predetermined gap is irradiated with a reflected light of an optical probe pulse from said reflected light acquisition means; and second photoelectric conversion means comprising:
said semi-insulating photoconductive substrate,
said second signal transmission line and a signal pick-up electrode disposed with a second predetermined gap therebetween on said one surface of said semi-insulating photoconductive substrate, and
means for irradiating an area including said second predetermined gap of said semi-insulating photoconductive substrate with an optical probe pulse generated by the other of said pair of short-width optical pulse generating means, whereby an electric potential on said second signal transmission lines is taken out to said signal pick-up electrode each time when said area including said second predetermined gap is irradiated with an optical probe pulse generated by said the other short-width optical pulse generating means.

11. The reflection point measuring apparatus according to claim 10, wherein said second signal transmission line has an extended portion substantially perpendicular thereto and said extended portion is disposed in alignment with said signal pick-up electrode with said second predetermined gap.

12. A reflection point measuring apparatus comprising:

a pair of short-width optical pulse generating means for generating two optical probe pulses having a narrow pulse width and slightly differing in frequency from each other;

first photoelectric conversion means comprising:
a semi-insulating photoconductive substrate,
a first and a second signal transmission lines disposed with a first predetermined gap therebetween on one surface of said semi-insulating photoconductive substrate, said first signal transmission line being adapted to be supplied with a DC voltage, said second transmission line being adapted to be connected to an object to be measured, and
means for irradiating an area including said first predetermined gap of said semi-insulating photoconductive substrate with an optical probe pulse generated by one of said pair of short-width optical pulse generating means, whereby a short-width electric pulse is produced on said second signal transmission line each time when said area including said first predetermined gap is irradiated with an optical probe pulse generated by said one short-width optical pulse generating means; and second photoelectric conversion means comprising:
   said semi-insulating photoconductive substrate,
   said second signal transmission line and a signal pick-up electrode disposed with a second predetermined gap therebetween on said one surface of said semi-insulating photoconductive substrate, and
   means for irradiating an area including said second predetermined gap of said semi-insulating photoconductive substrate with an optical probe pulse generated by the other of said pair of short-width optical pulse generating means, whereby an electric potential on said second signal transmission line is taken out to said signal pick-up electrode each time when said area including said second predetermined gap is irradiated with an optical probe pulse generated by said the other short-width optical pulse generating means.

13. The reflection point measuring apparatus according to claim 12, wherein said second signal transmission line has an extended portion substantially perpendicular thereto and said extended portion is disposed in alignment with said signal pick-up electrode with said second predetermined gap.

14. A reflection point measuring apparatus comprising:
short-width optical pulse generating means for generating an optical probe pulse having a narrow pulse width;
an optical transmission line for directing an optical probe pulse generated by said short-width optical pulse generating means to be incident on an object to be measured;
reflected light acquisition means for receiving a reflected light reflected from said object and returned to said optical transmission line;
photoelectric conversion means comprising:
   a semi-insulating photoconductive substrate,
   a first and a second signal transmission lines disposed with a predetermined gap therebetween on one surface of said semi-insulating photoconductive substrate, said first signal transmission line being adapted to be supplied with a DC voltage, and
   means for irradiating an area including said predetermined gap of said semi-insulating photoconductive substrate with a reflected light supplied from said reflected light acquisition means, whereby a short-width electric pulse is produced on said second signal transmission line each time when said area including said first predetermined gap is irradiated with a reflected light from said reflected light acquisition means;
variable delay means for delaying an optical probe pulse generated by said short-width optical pulse generating means;
an electro-optical element comprising a reflection surface for reflecting an optical probe pulse delayed by said variable delay means and incident thereon, and coupled to said second signal transmission line, said electro-optical element changing the polarization of the delayed optical probe pulse depending upon an intensity of an electric field produced about said second signal transmission line while the delayed optical probe pulse is incident on said electro-optical element and reflected from said reflection surface; and
a photodetector on which an optical probe pulse reflected from said electro-optical element is incident and for detecting an amount of change in polarization of the optical probe pulse given by said electro-optical element and converting the amount of change in polarization into an electric signal.

15. A reflection point measuring apparatus comprising:
a pair of short-width optical pulse generating means for generating two optical probe pulses having a narrow pulse width and slightly differing in frequency from each other;
an optical transmission line for directing an optical probe pulse generated by said short-width optical pulse generating means to be incident on an object to be measured; reflected light acquisition means for receiving a reflected light of an optical probe pulse which has been incident on said object;
photoelectric conversion means comprising:
   a semi-insulating photoconductive substrate,
   a first and a second signal transmission lines disposed with a predetermined gap therebetween on one surface of said semi-insulating photoconductive substrate, said first signal transmission line being adapted to be supplied with a DC voltage, and
   means for irradiating an area including said predetermined gap of said semi-insulating photoconductive substrate with a reflected light of an optical probe pulse supplied from said reflected light acquisition means, whereby a short-width electric pulse is produced on said second signal transmission line each time when said area including said predetermined gap is irradiated with a reflected light of an optical probe pulse from said reflected light acquisition means;
variable delay means for delaying an optical probe pulse generated by the other of said pair of short-width optical pulse generating means;
an electro-optical element comprising a reflection surface for reflecting an optical probe pulse delayed by said variable delay means and incident thereon, and coupled to said second signal transmission line, said electro-optical element changing the polarization of the delayed optical probe pulse depending upon an intensity of an electric field produced about said second signal transmission line while the delayed optical probe pulse is incident on said electro-optical element and reflected from said reflection surface; and
a photodetector on which an optical probe pulse reflected from said electro-optical element is incident and for detecting an amount of change in polarization of the optical probe pulse given by said electro-optical element and converting the amount of change in polarization into an electric signal.

16. A reflection point measuring apparatus comprising:
a pair of short-width optical pulse generating means for generating two optical probe pulses having a narrow pulse width and slightly differing in frequency from each other;
photoelectric conversion means comprising:
   a semi-insulating photoconductive substrate,
   a first and a second signal transmission lines disposed with a predetermined gap therebetween on one surface of said semi-insulating photoconductive substrate, said first signal transmission line being adapted to be supplied with a DC voltage, said second signal transmission line being adapted to be connected to an object to be measured, and
   means for irradiating an area including said predetermined gap of said semi-insulating photoconductive substrate with an optical probe pulse generated by one of said pair of short-width optical pulse generating means, whereby a short-width electric pulse is produced on said second signal transmission line each time when said area including said predetermined gap is irradiated with an optical probe pulse generated by said one short-width optical pulse generating means;

variable delay means for delaying an optical probe pulse generated by the other of said pair of short-width optical pulse generating means;

an electro-optical element comprising a reflection surface for reflecting an optical probe pulse delayed by said variable delay means and incident thereon, and coupled to said second signal transmission line, said electro-optical element changing the polarization of the delayed optical probe pulse depending upon an intensity of an electric field produced about said second signal transmission line while the delayed optical probe pulse is incident on said electro-optical element and reflected from said reflection surface; and a photodetector on which an optical probe pulse reflected from said electro-optical element is incident and for detecting an amount of change in polarization of the optical probe pulse given by said electro-optical element and converting the amount of change in polarization into an electric signal.

* * * * *